United States Patent
Lv et al.

(10) Patent No.: US 12,367,265 B1
(45) Date of Patent: Jul. 22, 2025

(54) LITHOLOGY IDENTIFICATION METHOD, LITHOLOGY IDENTIFICATION DEVICE, ELECTRONIC APPARATUS AND NON-TRANSITORY STORAGE MEDIUM

(71) Applicant: Institute of Geology and Geophysics, Chinese Academy of Sciences (IGGCAS)., Beijing (CN)

(72) Inventors: Pengfei Lv, Beijing (CN); Guoqiang Xue, Beijing (CN); Weiying Chen, Beijing (CN)

(73) Assignee: Institute of Geology and Geophysics, Chinese Academy of Sciences (IGGCAS), Beijing (CN)

( * ) Notice: Subject to any disclaimer, the term of this patent is extended or adjusted under 35 U.S.C. 154(b) by 0 days.

(21) Appl. No.: 19/026,859

(22) Filed: Jan. 17, 2025

(30) Foreign Application Priority Data

Dec. 17, 2024   (CN) .......................... 202411856764.0

(51) Int. Cl.
| | |
|---|---|
| *G06F 18/2413* | (2023.01) |
| *G01V 1/30* | (2006.01) |
| *G06F 18/23213* | (2023.01) |
| *G06F 18/2415* | (2023.01) |

(52) U.S. Cl.
CPC .......... *G06F 18/24147* (2023.01); *G01V 1/30* (2013.01); *G06F 18/23213* (2023.01); *G06F 18/2415* (2023.01)

(58) Field of Classification Search
CPC ......... G06F 18/24147; G06F 18/23213; G06F 18/2415; G01V 1/30
See application file for complete search history.

(56) References Cited

U.S. PATENT DOCUMENTS

2004/0117121 A1*   6/2004   Gray .................... G01V 1/30
                                                              702/11

FOREIGN PATENT DOCUMENTS

| CN | 116524234 A | * | 8/2023 |
| CN | 119004289 A | * | 11/2024 |

OTHER PUBLICATIONS

English machine translation of CN119004289A (Year: 2024).*
English machine translation of CN116524234A (Year: 2023).*

* cited by examiner

*Primary Examiner* — Walter L Lindsay, Jr.
*Assistant Examiner* — Geoffrey T Evans
(74) *Attorney, Agent, or Firm* — Hemisphere Law, PLLC; Zhigang Ma

(57) ABSTRACT

Provided are a lithology identification method, a lithology identification device, an electronic apparatus and a non-transitory storage medium. The lithology identification method includes: obtaining a dataset, where the dataset includes feature sets and lithology labels, and each feature of the feature sets corresponds spatially one-to-one with a corresponding one of the lithology labels; performing locality preserving projections (LPP) on the dataset, to thereby obtain a preprocessed dataset; and constructing a machine learning model, and training the machine learning model by using the preprocessed dataset to obtain a recognition model for lithology identification, during a process for training the machine learning model, a distance constraint and a geological constraint are introduced sequentially.

8 Claims, 18 Drawing Sheets

LITHOLOGY IDENTIFICATION METHOD, LITHOLOGY IDENTIFICATION DEVICE, ELECTRONIC APPARATUS AND NON-TRANSITORY STORAGE MEDIUM

TECHNICAL FIELD

The present disclosure relates to the technical field of geophysical exploration, and particularly to a lithology identification method, a lithology identification device, an electronic apparatus and a non-transitory storage medium.

BACKGROUND

Comprehensive geophysical survey, including a gravity method, a magnetic method, an electromagnetic method and a seismic method, is a key means to reveal an underground structure and material properties of a mining area. However, it is still a great challenge to integrate diversified measured data to improve the accuracy and reliability of description of the underground structure. In recent years, with the development of a machine learning technology, the fusion of multi-source geophysical data has been greatly improved, and the interpretation accuracy and reliability in mineral resources prediction, geological mapping and rock classification have been significantly improved.

Although image fusion technologies can reduce an interpretation error and reduce calculation requirements in the application of multi-source data fusion, in terms of lithology identification, these technologies are limited by the lack of borehole lithology labels as constraints. Traditional machine learning technologies (such as technologies supporting a vector machine, a back propagation neural network and a random forest) have shown remarkable effects in evaluating a mineralization probability in three-dimensional mineral exploration, but these methods are usually limited to dividing areas into mining areas and non-mining areas, ignoring the important role of lithology. In addition, these technologies are highly dependent on tag data, and the performance of these technologies will be significantly restricted when the tag data is scarce and diverse.

The identification of underground lithology is very important to understand the formation, types and distribution of ore deposits. However, the scarcity and imbalance of drilling data labels hinder the progress in this field. In order to overcome these limitations, an innovative machine learning strategy has been introduced in recent research, which can improve the accuracy of lithology identification by dealing with the problems of insufficient tag data and unbalanced categories. For example, an active Learning and Semi-supervised Learning for Imbalanced Nonlinear Borehole data (ALSLINB) method proposed by Ren et al. combines active learning and semi-supervised learning to expand a label set of nonlinear borehole data, but it is difficult to generalize the label set to unknown data types. Lv et al. put forward a semi-supervised machine learning variational Gaussian mixture model (SsL-VGMM), which deals with limited and unbalanced data and adapts to new data types through a variational Gaussian mixture model. However, these methods still face the problem of uneven spatial distribution of borehole data when applied in practical scenes.

SUMMARY

The present disclosure provides a lithology identification method, a lithology identification device, an electronic apparatus and a non-transitory storage medium. By considering a local neighborhood relationship between data points, a prediction accuracy is significantly improved under the condition of limited and unbalanced tag data.

In a first aspect, a lithology identification method is provided, which includes:
  obtaining a dataset, where the dataset includes feature sets and lithology labels, and each feature of the feature sets corresponds spatially one-to-one with a corresponding one of the lithology labels;
  performing locality preserving projections (LPP) on the dataset, to thereby obtain a preprocessed dataset; and
  constructing a machine learning model, and training the machine learning model by using the preprocessed dataset to obtain a recognition model for lithology identification, where during a process for training the machine learning model, a distance constraint and a geological constraint are introduced sequentially; the distance constraint includes assigning cluster labels by minimizing a distance between each of data points and a nearest cluster center of each of the data points, and selecting an initial cluster center to optimize an assignment process; and the geological constraint uses the lithology labels provided by the preprocessed dataset as a constraint condition.

In an embodiment, the performing LPP on the dataset, to thereby obtain the preprocessed dataset includes:
  constructing a weight matrix, where the weight matrix is defined by a Gaussian kernel function, and the weight matrix is configured to capture local adjacency relationships between the data points in the dataset;
  establishing an objective function by taking finding a projection matrix as an optimization target, where the projection matrix is configured to: in a low-dimensional space determined based on the projection matrix, make data still keep an original local structure; and
  determining the projection matrix based on the objective function, and performing the LPP on the dataset by using the projection matrix to obtain the preprocessed dataset.

In an embodiment, the objective function is expressed as follows:

$$\min_A \Sigma_{i,j} \|A^T x_i - A^T x_j\|^2 W_{ij} A^T X D X^T A = I$$

where X represents a data matrix, D represents a diagonal matrix, I represents an identity matrix, A represents a projection matrix, $x_i$ and $x_j$ respectively represent the an i-th data point and a j-th data point in the dataset, $W_{ij}$ represents a weight matrix of the data points $x_i$ and $x_j$, and T represents an operation of matrix transpose.

In an embodiment, the distance constraint includes:
  randomly selecting a sample point from the preprocessed dataset as a first initial cluster center c;
  calculating a shortest distance between each sample point of the preprocessed dataset and existing cluster centers;
  calculating a probability of each sample point of the preprocessed dataset being selected as a next cluster center, where a calculation formula for the probability of each sample point of the preprocessed dataset being selected as the next cluster center is expressed as follows:

$$P(x) = \frac{D(x)^2}{\sum_{x \in X1} D(x)^2}$$

where P(x) represents the probability of each sample point of the preprocessed dataset being selected as the next cluster center, x represents the sample point, X1 represents the preprocessed dataset, and D(x) represents the shortest distance between each sample point of the preprocessed dataset and existing cluster centers;

selecting the sample point corresponding to a maximum probability value or a maximum probability distribution as the next cluster center; and iteratively updating the existing cluster centers and cluster assignments of sample points by using a k-means algorithm until the cluster assignments no longer change, comparing posterior probabilities of labeled data points on clusters to determine a category with a highest probability of each of the labeled data points as a most likely category to which each of the labeled data points belongs.

In an embodiment, the geological constraint includes:

identifying, based on the distance constraint, all labeled data points whose labels are different from labels of current labeled data points; and applying a penalty function to a probability of each of the labeled data points on a current cluster based on a formula expressed as follows:

$$r_{nk} = \begin{cases} \alpha \cdot r_{nk}, & \text{if } n \in r_{label\_ind} \\ r_{nk}, & \text{otherwise} \end{cases}$$

where $r_{nk}$ represents a responsibility of a data point n belonging to a distribution k, $r_{label\_ind}$ represents a set of data point indices, each of labels in the set of data point indices $r_{label\_ind}$ is different from a label of a data point with a highest probability belonging to the distribution k, $\alpha$ represents a penalty factor, and otherwise represents $n \notin r_{label\_ind}$.

In an embodiment, the lithology identification method further includes: evaluating lithology classification and prediction performance of the recognition model for lithology identification by using an accuracy, a confusion matrix, and an F1 score as evaluation metrics, where calculation formulas for the accuracy and the F1 score are expressed as follows:

$$\text{Accuracy} = \frac{N_c}{N_T}$$

$$\text{Precision} = \frac{TP}{TP + FP}$$

$$\text{Recall} = \frac{TP}{TP + FN}$$

$$F1 = 2 \times \frac{\text{Precision} \times \text{Recall}}{\text{Precision} + \text{Recall}}$$

where Accuracy represents the accuracy, $N_c$ represents a number of samples correctly classified or predicted, $N_T$ represents a total number of samples, Precision represents a precision, Recall represents a recall, F1 represents the F1 score, TP represents a number of instances correctly predicted as positive, FP represents a number of instances incorrectly predicted as positive, and FN represents a number of instances incorrectly predicted as negative.

In an embodiment, the lithology identification method further includes: using the machine learning model to determine a lithologic distribution of a target mining area, and mining minerals in the target mining area based on lithologic distribution.

In a second aspect, a lithology identification device is provided, which includes:

a data obtaining module, configured to obtain a dataset, where the dataset includes feature sets and lithology labels, and each feature of the feature sets corresponds spatially one-to-one with a corresponding one of the lithology labels;

a data processing module, configured to perform locality preserving projections (LPP) on the dataset, to thereby obtain a preprocessed dataset; and a model training module, configured to construct a machine learning model, and train the machine learning model by using the preprocessed dataset to obtain a recognition model for lithology identification, where during a process for training the machine learning model, a distance constraint and a geological constraint are introduced sequentially; the distance constraint includes assigning cluster labels by minimizing a distance between each of data points and a nearest cluster center of each of the data points, and selecting an initial cluster center to optimize an assignment process; and the geological constraint uses the lithology labels provided by the preprocessed dataset as a constraint condition.

In a third aspect, an electronic apparatus is provided, which includes: a processor and a memory, where the memory is configured to store instructions, and the processor is configured to execute the instructions stored in the memory to cause the electronic apparatus to perform the lithology identification method described above.

In a fourth aspect, a non-transitory computer-readable storage medium is provided, computer-executable instructions are stored in the non-transitory computer-readable storage medium, and the computer-executable instructions, when executed by a processor, are configured to implement the lithology identification method.

The lithology identification method, the lithology identification device, the electronic apparatus and the non-transitory storage medium of the present disclosure have at least the following beneficial effects:

Based on multi-source geophysical data, the present disclosure realizes high-precision identification and positioning of lithologies in a complex underground structure. In the case of scarce labeled data and category imbalance, through application verification in the Bayan Obo mineral deposit, it can accurately identify key lithologies such as slate, dolomite, mineralized dolomite, and sandstone. Moreover, the present disclosure can accurately locate mineralized dolomite in a depth range of 200 meters (m) to 1600 m, which is highly consistent with drilling data. The present disclosure provides a brand-new solution for mineral exploration in complex geological environments and lays the foundation for future research on the ore-forming mechanisms and lithologic distribution patterns of specific mining areas.

BRIEF DESCRIPTION OF DRAWINGS

Accompanying drawings, which are incorporated in the specification and constitute a part of the specification, illustrate embodiments consistent with the present disclosure and together with the specification serve to explain the principles of the present disclosure.

Figure 1:
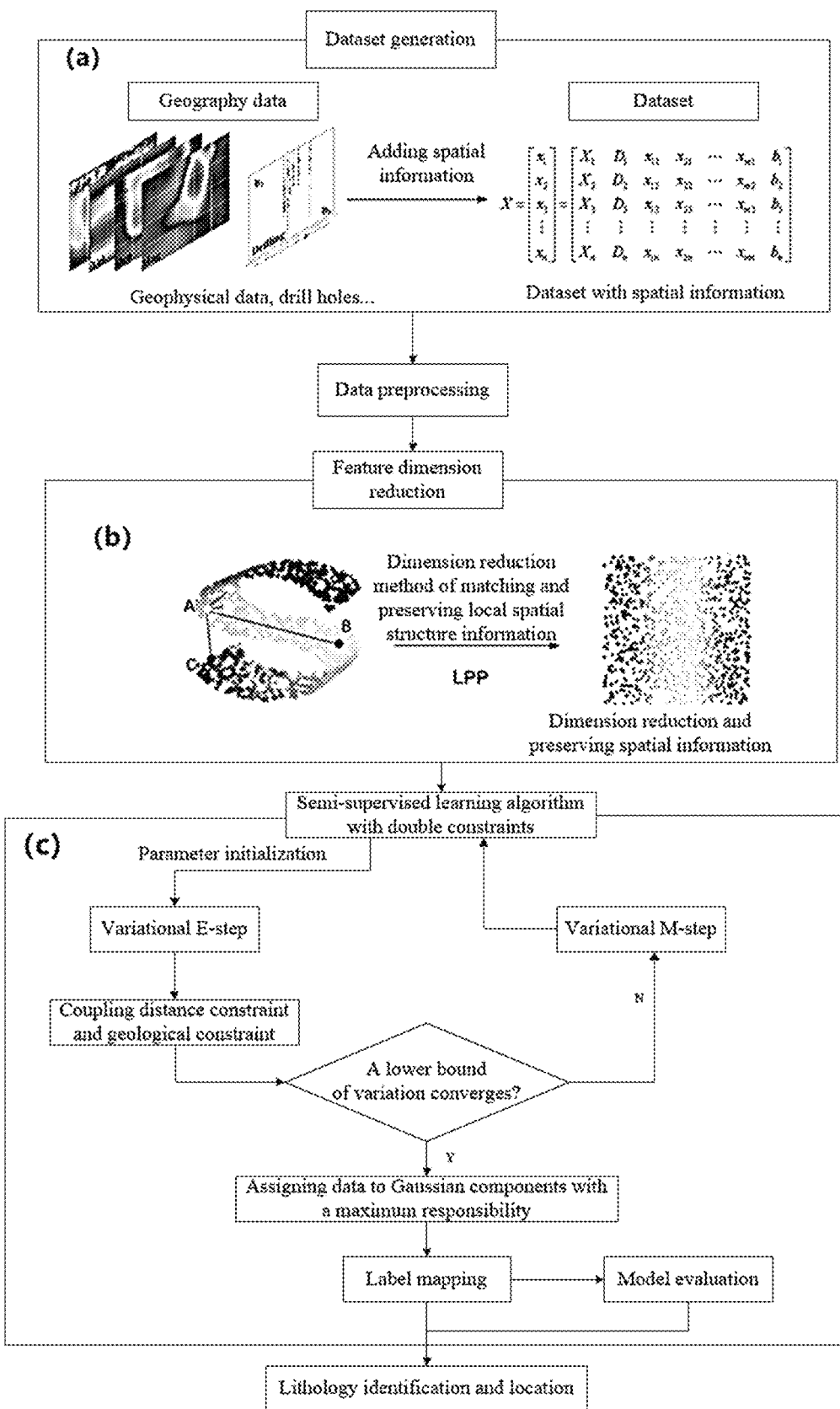
FIG. 1 illustrates a schematic flowchart of a lithology identification method according to an embodiment of the present disclosure.

Through the above drawings, embodiments of the present disclosure have been shown, which will be described in more detail hereinafter. These drawings and written descriptions are not intended to limit the scope of the concept of the present disclosure in any way, but to explain the concept of the present disclosure to those skilled in the art by referring to specific embodiments.

DETAILED DESCRIPTION OF EMBODIMENTS

Exemplary embodiments will be described in detail, examples of these exemplary embodiments are shown in the accompanying drawings. In the following description, unless otherwise indicated, the same numbers in different drawings represent the same or similar elements. The implementations described in the following exemplary embodiments do not represent all implementations consistent with the present disclosure. On the contrary, they are merely examples of devices and methods consistent with some aspects of the present disclosure as detailed in the appended claims.

It should be noted that the links and related information therein, platform-related information involved in the disclosure, which includes but are not limited to data for analysis, stored data, and displayed data, are all information and data that have been understood and authorized by the relevant users or fully authorized by all parties. Moreover, the collection, use, processing, transmission, provision, publication, and application of such data are all in compliance with the laws, regulations, and standards of the relevant countries and regions. Necessary confidentiality measures have been taken, and they do not violate public order and good morals, conforming to the principles of legality, propriety, and necessity.

The technical solutions of the disclosure and how the technical solutions of the present disclosure can solve the above technical problems will be described in detail with specific embodiments. The following specific embodiments can be combined with each other, and the same or similar concepts or processes may not be repeated in some embodiments. Embodiments of the present disclosure will be described below with reference to the accompanying drawings.

The embodiment of the present disclosure provides a prior evidence collection method. It should be noted that the lithology identification method provided in the present disclosure can be implemented by any electronic apparatus with data processing capability, and can also be implemented by a lithology identification system. It should be noted that the lithology identification system may be independently deployed on an electronic apparatus in any environment (for example, can be independently deployed on an edge server in an edge environment), or may be fully deployed in a cloud environment, or may be distributed in different environments.

For example, the lithology identification system can be logically divided into multiple parts, and each part has a different function. The multiple parts of the lithology identification system can be deployed in any two or three of the electronic apparatus (located at a user side, such as a client), the edge environment and the cloud environment respectively. The edge environment is an environment that includes a collection of edge electronic apparatus that are close to the electronic apparatus. The edge electronic apparatus includes an edge server and an edge station with computing power. Various parts of the lithology identification system deployed in different environments or apparatuses cooperate to realize the function of a data processing platform.

As should be understood, the present disclosure does not restrict which parts of the lithology identification system are deployed in what environment, but can be deployed adaptively according to the computing power of the electronic apparatus, the resource occupancy of the edge environment and the cloud environment or specific application requirements in a practical application.

FIG. 1 illustrates a schematic flowchart of a lithology identification method according to an embodiment of the present disclosure. Specifically, the lithology identification method may include first, second, and third steps.

In the first step, a dataset is obtained, the dataset includes feature sets and lithology labels, and each feature of the feature sets corresponds spatially one-to-one with a corresponding one of the lithology labels.

In this embodiment, a purpose of the first step is to establish the dataset. For example, a multi-source geophysical dataset can be constructed by integrating data obtained from comprehensive geophysical exploration, including gravity methods, magnetic methods, electromagnetic methods, and seismic methods, according to their spatial correspondence to thereby obtain the dataset.

Specifically, the dataset may be expressed as X= $[X_1, X_2, \ldots X_n]^T$, which is composed of feature sets and lithology labels, and features in the feature sets and the lithology labels have a one-to-one correspondence in spatial location. $X_1, X_2, \ldots X_n$ represent a first feature set, a second feature set, . . . , an n-th feature set. Considering the continuity of a geological structure, it is crucial to preserve local neighborhood information of data. Therefore, when constructing a dataset matrix, this embodiment not only takes into account traditional geoscientific features but also incorporates spatial location information $X_i$ (a horizontal coordinate) and $D_i$ (a depth coordinate), as important features, into a model. A feature set can be expressed as $(x_{1i}, x_{2i}, x_{3i} \ldots x_{mi})$, which is composed of different geophysical data, where i=1, 2, . . . n, m represents a physical property parameter, such as a resistivity and a density, and n represents a number of samples. The lithology labels refer to lithology categories, which are provided by drilling geological data in this embodiment. Samples with known lithologies are called labeled data or data with labels, while samples with unknown lithologies are referred to as unlabeled data.

In the second step, locality preserving projections (LPP) is performed on the dataset, to thereby obtain a preprocessed dataset.

In this embodiment, a purpose of second step is to process the dataset constructed in the first step to obtain the preprocessed dataset. A method for processing the dataset includes various transformations and feature dimensionality reduction methods. Combinations of various Gaussian-like transformations are adopted to make the data conform to a "Gaussian-like" distribution, which makes the data more suitable for Gaussian mixture models; the LPP method is used for dimensionality reduction of multi-source geophysical data, thereby preserving spatial proximity relationships of the data to enhance the model's ability to recognize complex geological structures.

In an embodiment, the LPP is employed, which specifically achieves dimensionality reduction by preserving a local structure of the data. The processed dataset not only has fewer features but also retains key spatial structural properties.

In the LPP, a key step is to construct a weight matrix W, which is configured to capture local adjacency relationships between data points. This weight matrix is typically defined using a Gaussian kernel function, where larger weights are assigned to two data points $x_i$ and $x_j$ that are close in position. Subsequently, a goal of the LPP is to find a projection matrix such that in a new low-dimensional space, the data still maintains its original local structure. An objective function for this process is expressed as follows:

$$\min_A \Sigma_{i,j} \|A^T x_i - A^T x_j\|^2 W_{ij} A^T X D X^T A = I$$

where X represents a data matrix, D represents a diagonal matrix, I represents an identity matrix, A represents a projection matrix, $x_i$ and $x_j$ represent the an i-th data point and a j-th data point in the dataset, $W_{ij}$ represents a weight matrix of the data points $x_i$ and $x_j$, and T represents an operation of matrix transpose.

In the third step, a machine learning model is constructed, and the machine learning model is trained by using the preprocessed dataset to obtain a recognition model for lithology identification. During a process for training the machine learning model, a distance constraint and a geological constraint are introduced sequentially. The distance constraint includes assigning cluster labels by minimizing a distance between each of data points and a nearest cluster center of each of the data points, and selecting an initial cluster center to optimize the assignment process. The geological constraint uses the lithology labels provided by the preprocessed dataset as a constraint condition.

In this embodiment, a purpose of the third step is to train the constructed machine learning model using the preprocessed data obtained from the second step, in order to obtain the recognition model capable of lithology identification. Specifically, when dealing with real data from mining areas where lithology label data is scarce and the distribution of lithology labels is unbalanced, the variational Gaussian mixture model (VGMM) algorithm has been improved to propose a dual-Constraint semi-supervised variational Gaussian mixture model (TCS-VGMM), which includes two parts of constraints: distance constraint (KMeanspp) and geological constraint (a penalty function).

In an exemplary embodiment, the distance constraint involves assigning cluster labels by minimizing a distance between each data point and a nearest cluster center of each data point using the KMeanspp, and selecting an initial cluster center to optimize this assignment. The basic principle thereof is as follows: randomly (with uniform distribution) selecting a sample point from the preprocessed dataset as a first initial cluster center $c_i$; then calculating a shortest distance between each sample point and existing cluster centers, which is expressed as $D(x)$; subsequently, calculating a probability $P(x)$ of each sample point being selected as a next cluster center, and finally select a sample point corresponding to a maximum probability value (or a maximum probability distribution) as the next cluster center. The probability $P(x)$ of each sample point being selected as a next cluster center is expressed as follows:

$$P(x) = \frac{D(x)^2}{\sum_{x \in X1} D(x)^2}$$

where $P(x)$ represents the probability of each sample point being selected as the next cluster center, x represents the sample point, X1 represents the preprocessed dataset, and $D(x)$ represents the shortest distance between each sample point and the existing cluster centers.

Then, a standard k-means algorithm is used to iteratively update cluster centers and cluster assignments of the data points until the cluster assignments no longer change. Subsequently, posterior probabilities of labeled data points on corresponding clusters are compared to thereby determine a category with a highest probability of each of the labeled data points, as a most likely category to which each of the labeled data points belongs.

In this embodiment, interaction between the distance constraint and label constraint can enhance clustering and classification performance. The distance constraint is used to optimize initial values of a means $\mu_k$, a covariance $\Lambda_k$, and a mixture weight $\pi_k$ through a KMeans++ algorithm, with a goal of minimizing the distances between data points and cluster centers. This process iteratively updates a responsibility matrix ($r_{nk}$) in an E-step and optimizes Gaussian distribution parameters in an M-step, thereby improving a clustering structure by maximizing a likelihood function. The label constraint act in the E-step to prevent conflicts between Gaussian components and improve an optimization effect. After convergence, Gaussian components are assigned to data points based on corresponding maximum responsibility values and the data points are classified according to training labels. Unconstrained Gaussian components are marked as undefined, which aids in data prediction. The label constraint is expressed as follows:

$$J = \sum_{i=1}^{n} \min_{1 \leq j \leq k} \|x_i - \mu_j\|^2$$

where n represents a total number of the data points, k represents a total number of the cluster centers, $\mu_j$ represents a j-th cluster center of the cluster centers, $x_i$ represents an i-th data point of the data points, and J represents the label constraint.

On this basis, the geological constraint based on the penalty function are further imposed, using the provided lithology labels as a constraint condition to guide the KMeanspp algorithm to achieve more appropriate data partitioning. The basic principle is that: for each category, the same or different Gaussian components can be assigned to samples with the same lithology label; however, the same Gaussian component cannot be assigned to samples with different lithology labels. That is, all labeled data points whose labels are different from labels of current labeled data points are identified. The penalty function is applied to a probability of each of the labeled data points on a current cluster based on a formula expressed as follows:

$$r_{nk} = \begin{cases} \alpha \cdot r_{nk}, & \text{if } n \in r_{label\_ind} \\ r_{nk}, & \text{otherwise} \end{cases}$$

where $r_{nk}$ represents a responsibility of a data point n belonging to a distribution k, $r_{label\_ind}$ represents a set of data point indices, each of labels in the set of data point indices $r_{label\_ind}$ is different from a label of a data point with a highest probability belonging to the distribution k, $\alpha$ represents a penalty factor, and in this embodiment, $\alpha=10^{-8}$, and otherwise represents $n \notin r_{label\_ind}$. This is equivalent to avoiding the allocation of these data points to that cluster. This step is key to implementing the constraint condition, and directly uses known label information to influence the clustering assignment process.

Finally, the adjusted posterior probabilities (R) are normalized to ensure that a sum of clustering probabilities for the data points is 1. This ensures that the adjusted R can be correctly interpreted as a probability distribution.

In an exemplary embodiment, three commonly used model performance metrics—an accuracy, a confusion matrix, and an F1 Score—are employed to evaluate the lithology classification and prediction performance of the trained model. The accuracy is a ratio of a number of correctly predicted instances to a total number of instances. The confusion matrix is a matrix that specifically describes the performance of the model and is used to evaluate an accuracy of a classification model. For the confusion matrix (taking a binary classification problem as an example), it usually includes four parts: True Positive (TP), False Positive (FP), True Negative (TN), and False Negative (FN), which represent a number of instances correctly predicted as positive, a number of instances incorrectly predicted as positive (actually negative), a number of instances correctly predicted as negative, and a number of instances incorrectly predicted as negative (actually positive), respectively. The F1 Score is a measure that takes into account both a Precision and a Recall. Their calculation formulas are expressed as follows:

$$\text{Accuracy} = \frac{N_c}{N_T}$$

$$\text{Precision} = \frac{TP}{TP + FP}$$

$$\text{Recall} = \frac{TP}{TP + FN}$$

$$F1 = 2 \times \frac{\text{Precision} \times \text{Recall}}{\text{Precision} + \text{Recall}}$$

where Accuracy represents the accuracy, $N_c$ represents a number of samples correctly classified or predicted, $N_T$ represents a total number of samples, Precision represents the precision, Recall represents the recall, TP represents a number of instances correctly predicted as positive, FP represents a number of instances incorrectly predicted as positive, and FN represents a number of instances incorrectly predicted as negative.

The higher the precision, the more accurate the model is in predicting the positive class, with fewer false prediction; the higher the recall, the stronger the model's ability to identify actual positive instances, with fewer missed positive instances; and the F1 Score ranges from 0 to 1, where 1 represents a best possibility and 0 represents a worst performance. The higher the value of the F1 value, the better the model performs in considering both precision and comprehensiveness (i.e., recall).

The embodiments of the present disclosure will take the actual measurement data from the Bayan Obo mineral deposit as an example to verify the lithology identification methods proposed in the above embodiments.

Figure 2:
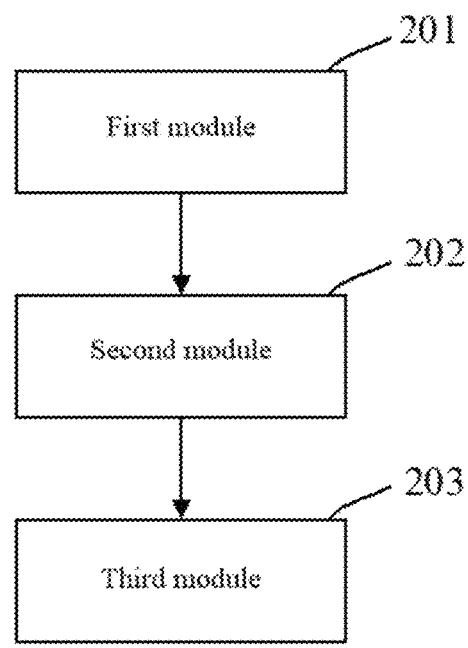
FIG. 2 illustrates a schematic structural diagram of a lithology identification system according to an embodiment of the present disclosure.
Figure 3A:
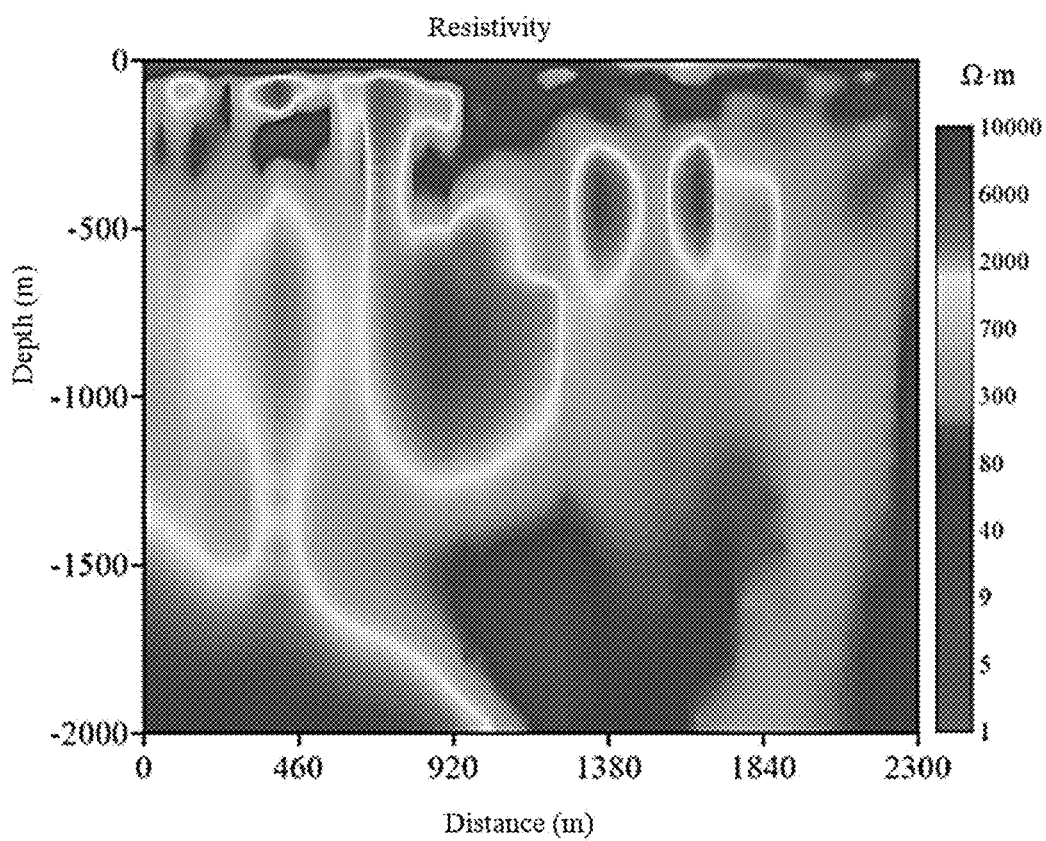
FIG. 3A illustrates a schematic diagram of a resistivity according to an embodiment of the present disclosure.
Figure 3B:
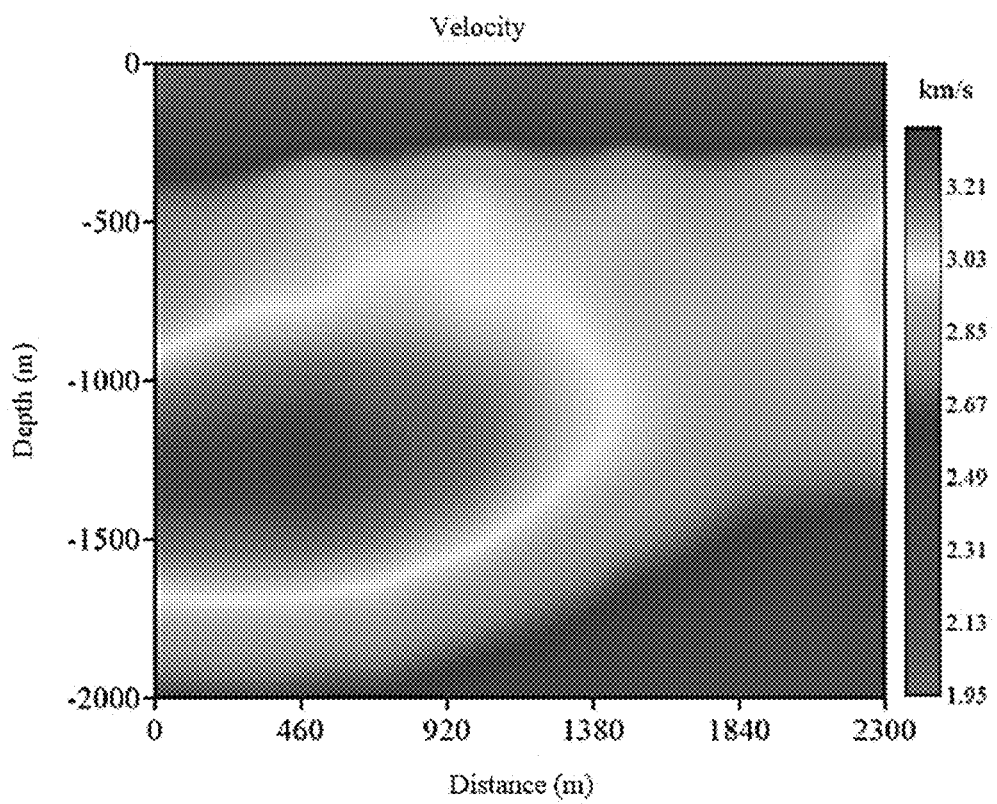
FIG. 3B illustrates a schematic diagram of a velocity according to an embodiment of the present disclosure.
Figure 3C:
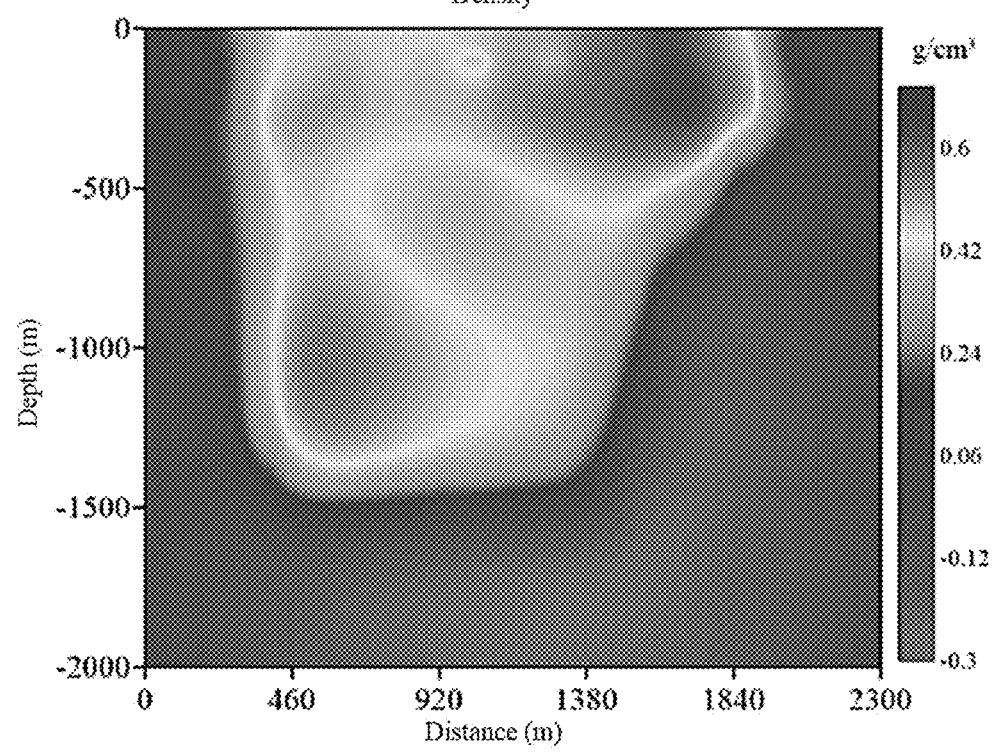
FIG. 3C illustrates a schematic diagram of a density according to an embodiment of the present disclosure.
Figure 3D:
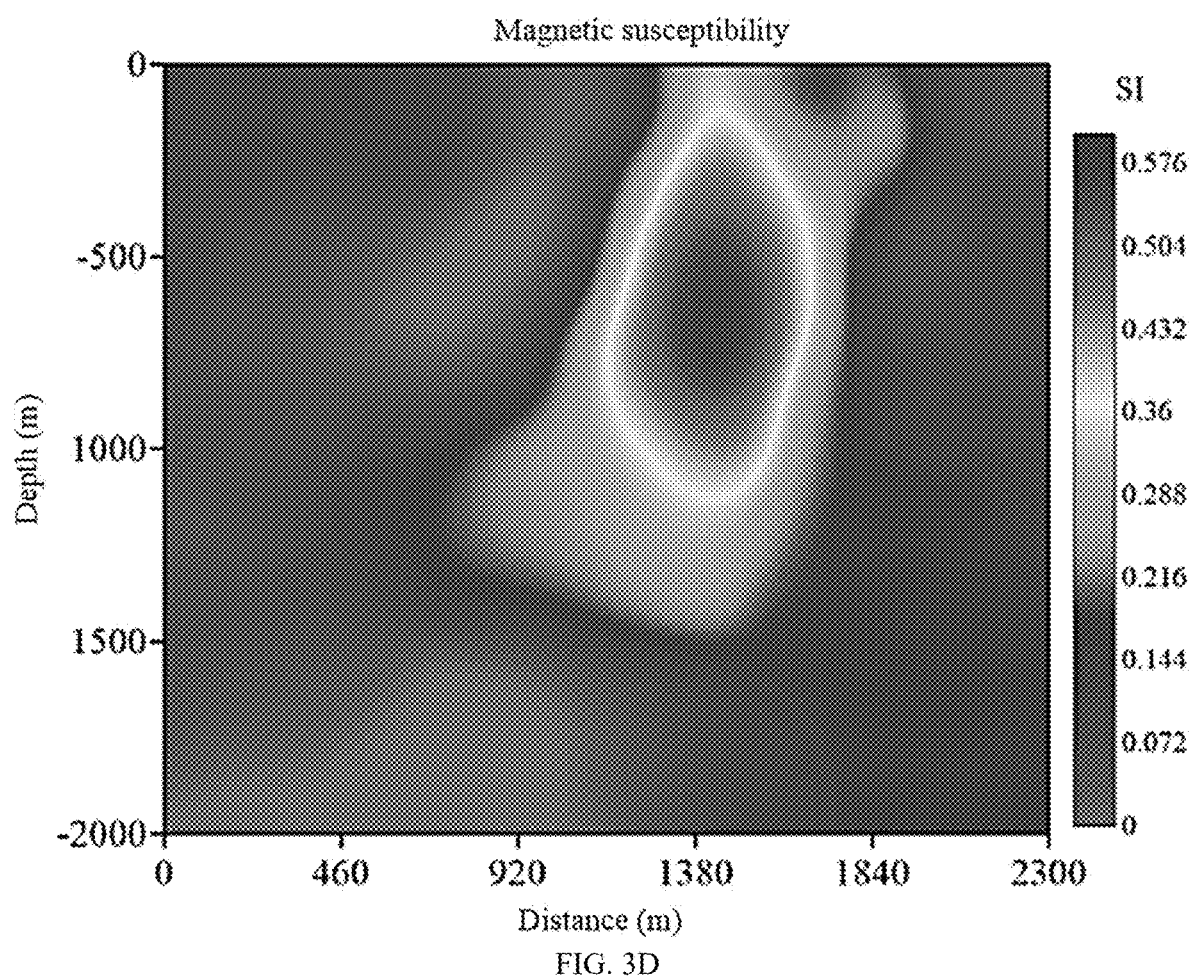
FIG. 3D illustrates a schematic diagram of a magnetic susceptibility according to an embodiment of the present disclosure.
Figure 3E:
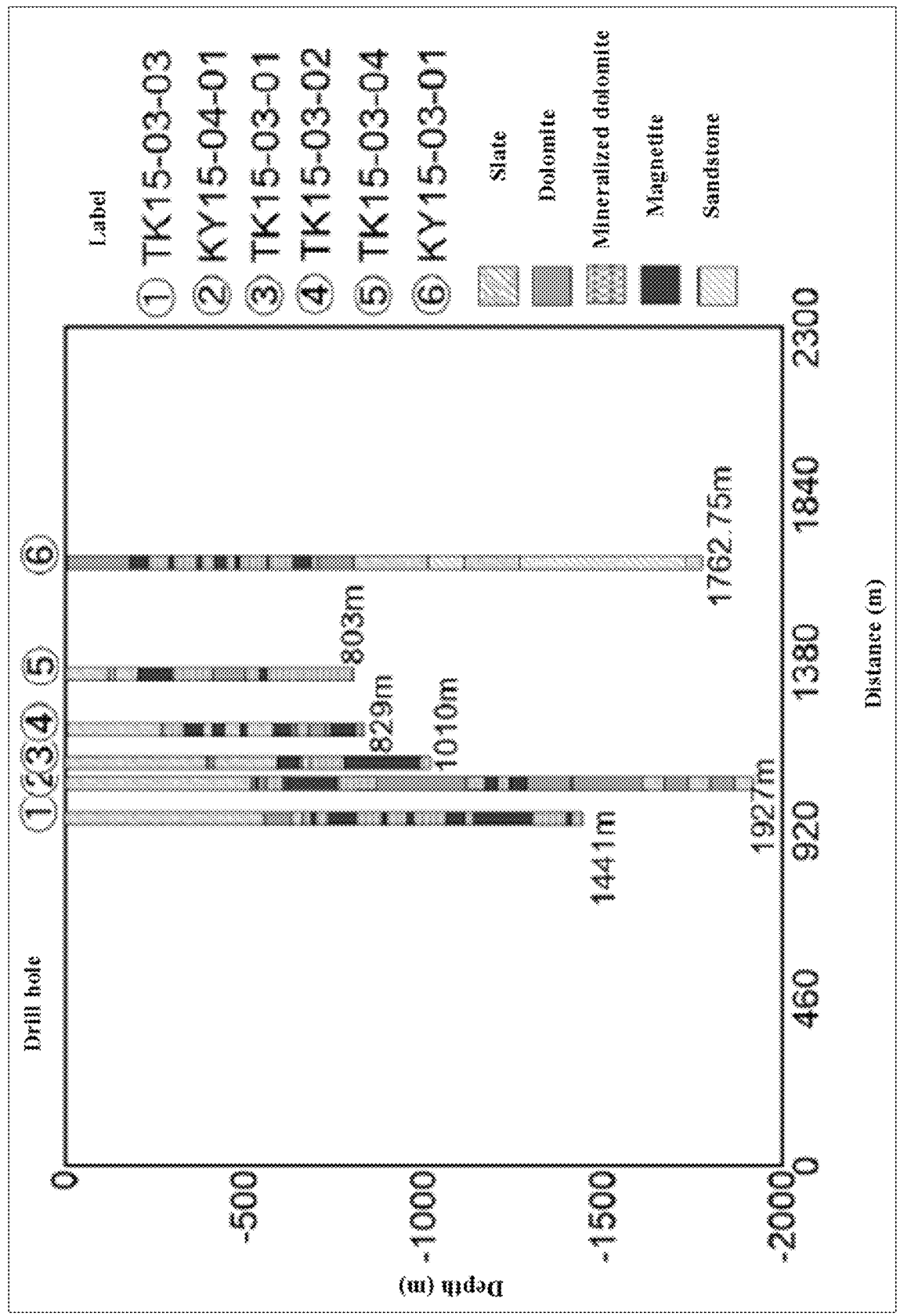
FIG. 3E illustrates a schematic diagram of a drill hole according to an embodiment of the present disclosure.

FIG. 2 is a structural diagram of a lithology identification system according to an exemplary embodiment, which is used to perform the lithology identification method described above. The lithology identification system includes a first module 201, a second module 202, and a third module 203, which are used to execute the first, second and third steps of the lithology identification method process, respectively. The details are as follows.

The first module 201 is configured to generate a dataset based on a multi-source geophysical dataset, as shown in FIG. 2.

The second module 202 is configured to perform data processing on the dataset, and the data processing includes various transformations and feature dimensionality reduction.

Figure 4A:
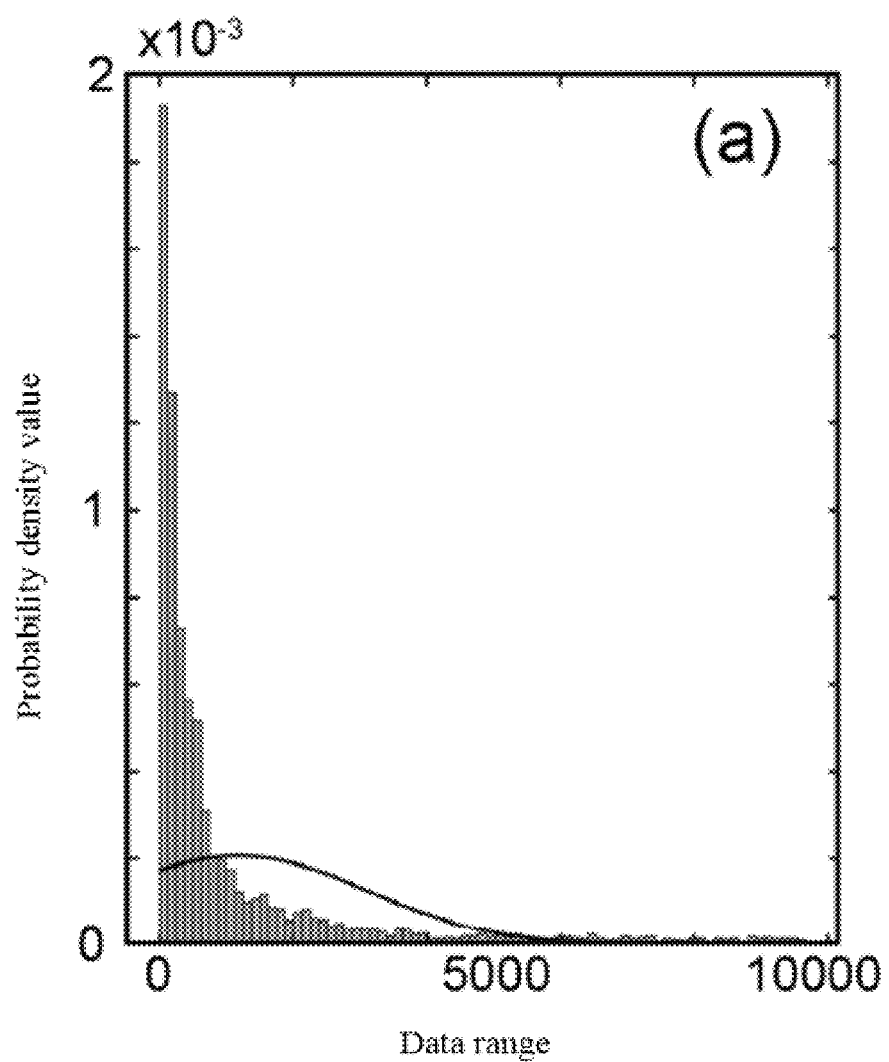
FIG. 4A illustrates a schematic diagram of an original data distribution of a resistivity according to an embodiment of the present disclosure.
Figure 4B:
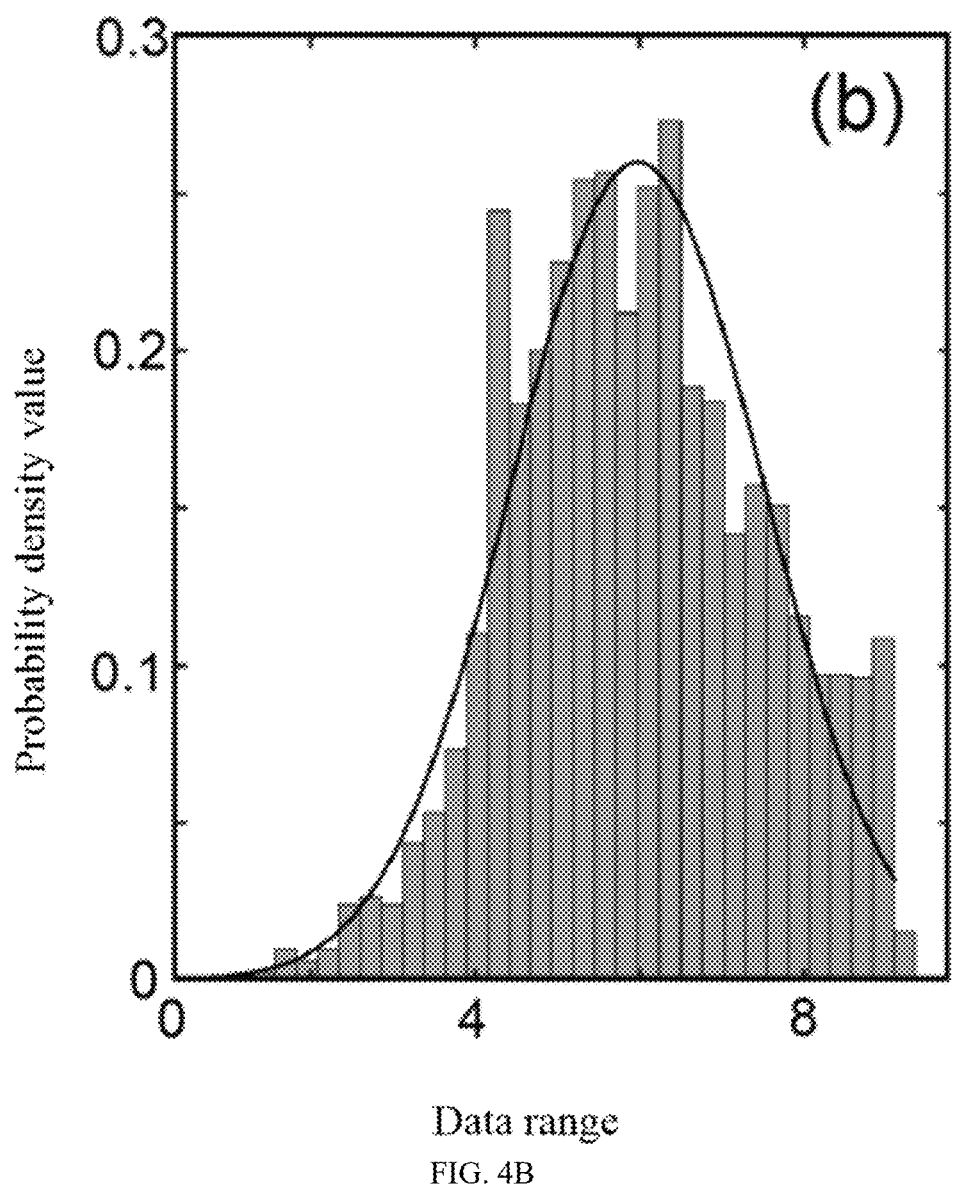
FIG. 4B illustrates a schematic diagram of a data distribution after Gaussian-like transformation of the resistivity according to an embodiment of the present disclosure.
Figure 4C:
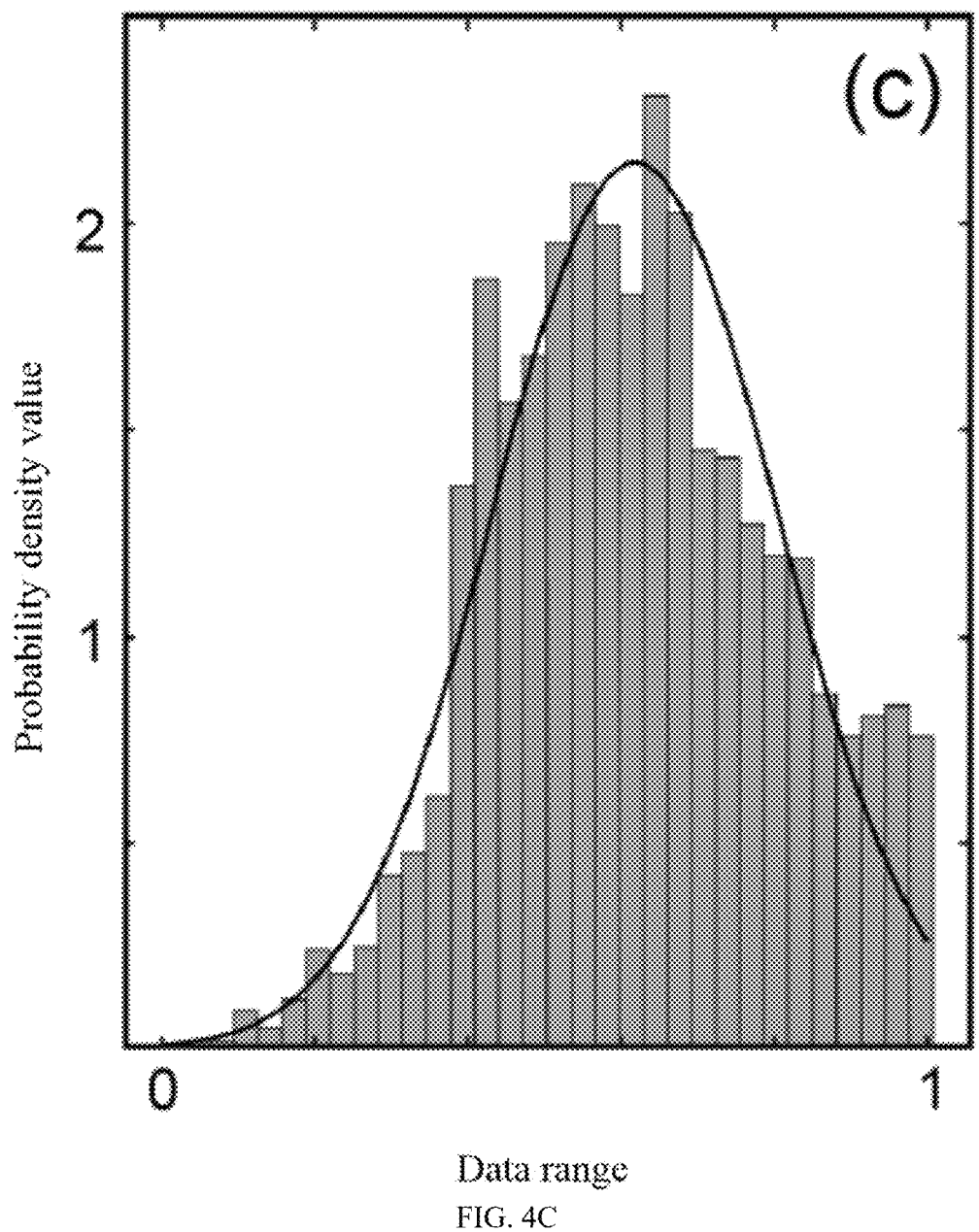
FIG. 4C illustrates a schematic diagram of a data distribution after normalizing of the resistivity according to an embodiment of the present disclosure.

During the preprocessing of the dataset, this embodiment uses a resistivity feature as an example to demonstrate how to transform the data into a form that approximates a Gaussian distribution. FIG. 4A shows a distribution characteristic of a resistivity, and FIG. 4B shows a distribution characteristic after Box-Cox transformation of the resistivity, which reveals that the distribution characteristic has become Gaussian-like. Subsequently, the distribution characteristic is standardized to obtain a distribution characteristic as shown in FIG. 4C. After completing the Gaussian transformation of all features, the locality preserving projections (LPP) algorithm is used to reduce the dimensionality of data features, including position coordinates, a resistivity, a magnetic susceptibility, a density, and a velocity, with a reduction to 3 dimensions as an example.

The third module 203 is configured to implement training and evaluation of a DCSM model (machine learning model).

Referring to the flowchart shown in FIG. 1, before inputting data into the TCS-VGMM model, standardization and dimensionality reduction of features are performed first. Since the theoretical synthetic data already conforms to a Gaussian distribution, no "Gaussian-like" transformation is used as a preprocessing method. The processed data is then used for the training of the TCS-VGMM model. Based on extensive experiments, in this embodiment, initial parameters $\pi_k$ and $\mu_k$ of all models are each set to 0.1, the model iterates 1000 times, and the tolerance for variational inference is set to 1e-8.

This embodiment applies the DCSM model to the Bayan Obo mineral deposit to evaluate its effectiveness in complex geological environments. Using different experiments on field datasets, four experiments were conducted, which are as follows.

Experiment 1: first and sixth drill holes are used as a training set, and second, third, fourth, and fifth drill holes are used as the test set.

Experiment 2: the first, second, and sixth drill holes are used as the training set, and the third, fourth, and fifth drill holes are used as the test set.

Experiment 3: the first, second, fifth, and sixth drill holes are used as the training set, and the third and fourth drill holes are used as the test set.

Experiment 4: the first, second, fourth, fifth, and sixth drill holes are used as the training set, and the third drill hole is used as the test set.

Figure 5A:
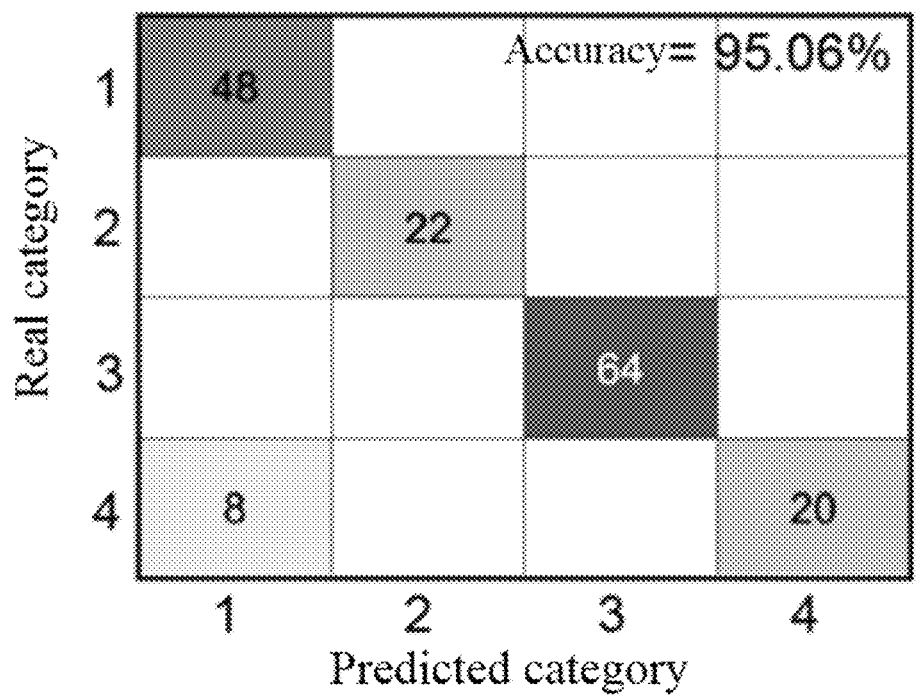
FIG. 5A illustrates a graph showing an evaluation result of a confusion matrix of a training set of an experiment 1.
Figure 5B:
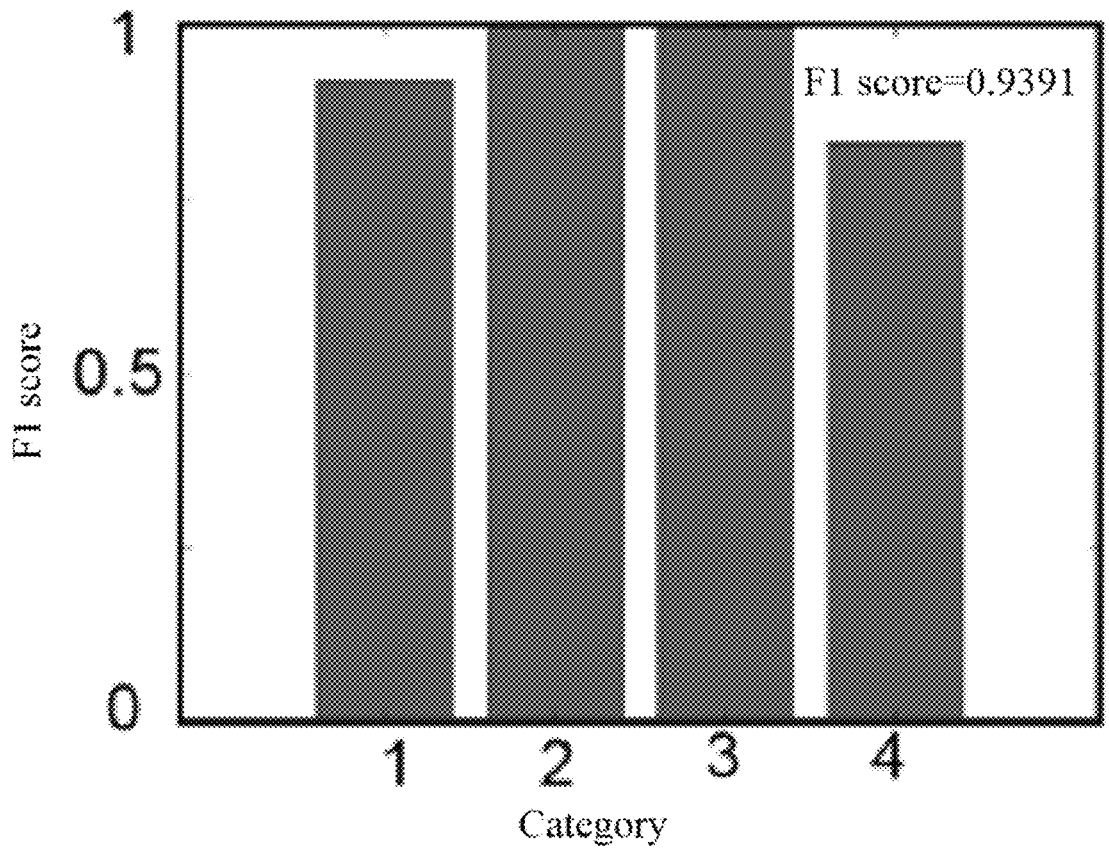
FIG. 5B illustrates a graph showing an evaluation result of an F1 core of the training set of the experiment 1.
Figure 5C:
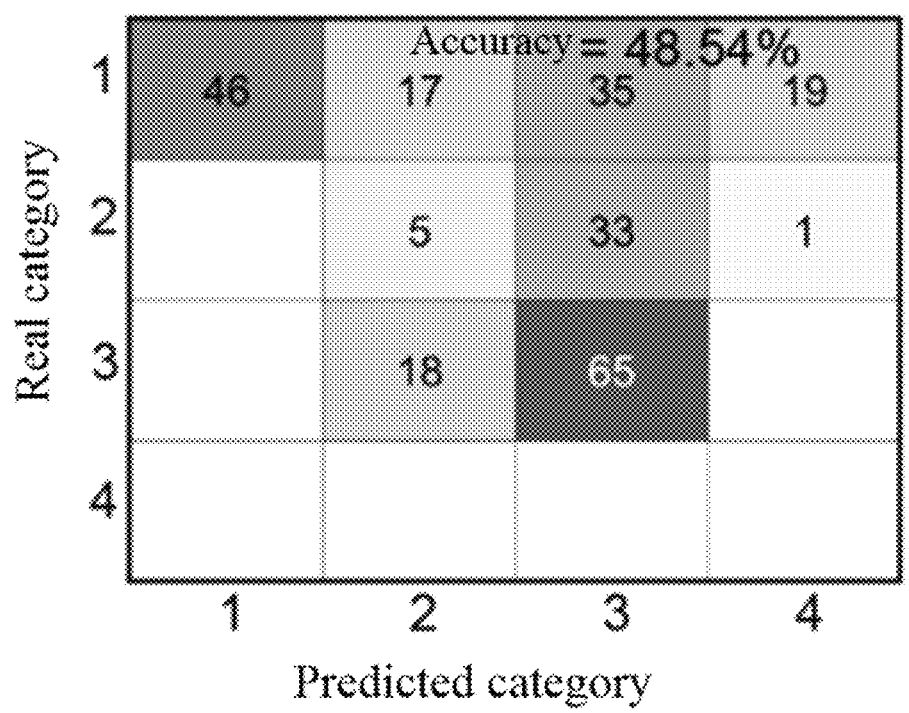
FIG. 5C illustrates a graph showing an evaluation result of a confusion matrix of a test set of the experiment 1.
Figure 5D:
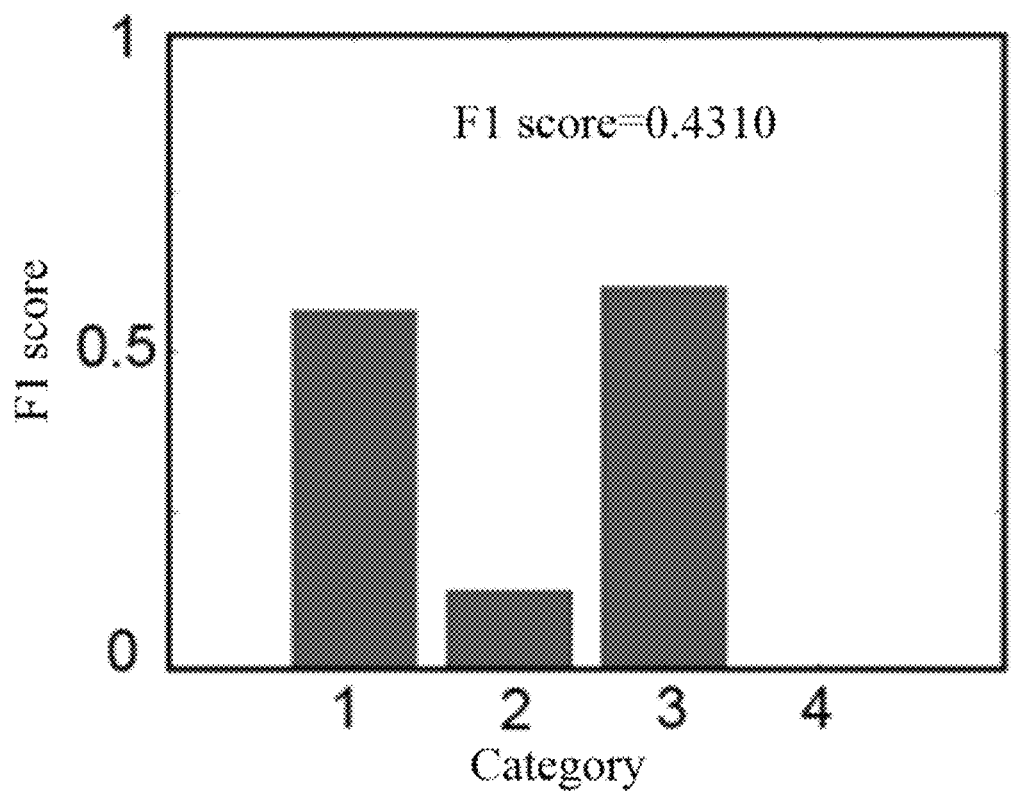
FIG. 5D illustrates a graph showing an evaluation result of an F1 core of the test set of the experiment 1.
Figure 5E:
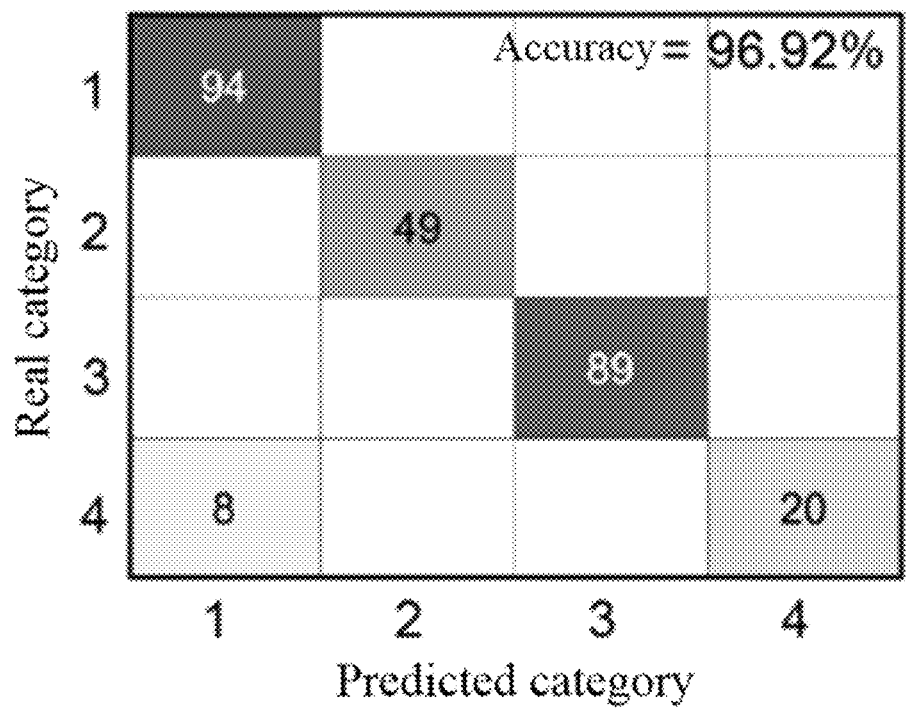
FIG. 5E illustrates a graph showing an evaluation result of a confusion matrix of a training set of an experiment 2.
Figure 5F:
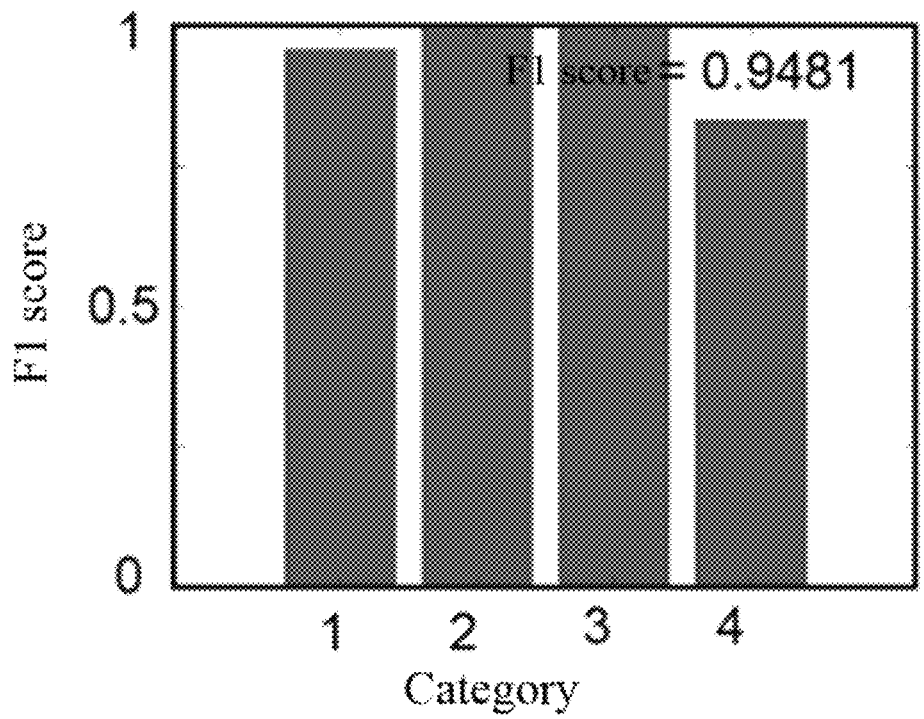
FIG. 5F illustrates a graph showing an evaluation result of an F1 core of the training set of the experiment 2.
Figure 5G:
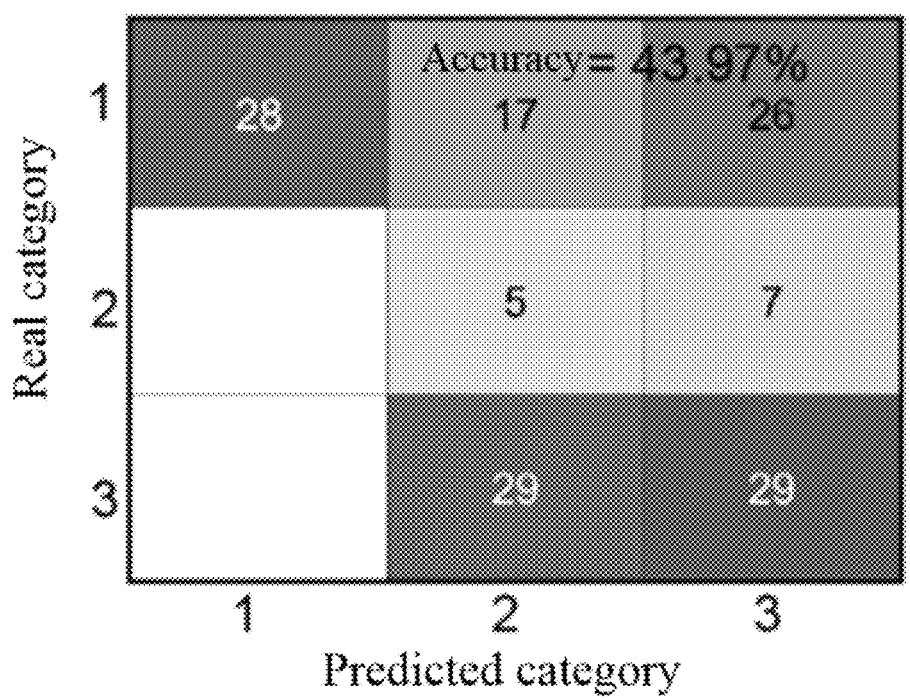
FIG. 5G illustrates a graph showing an evaluation result of a confusion matrix of a test set of the experiment 2.
Figure 5H:
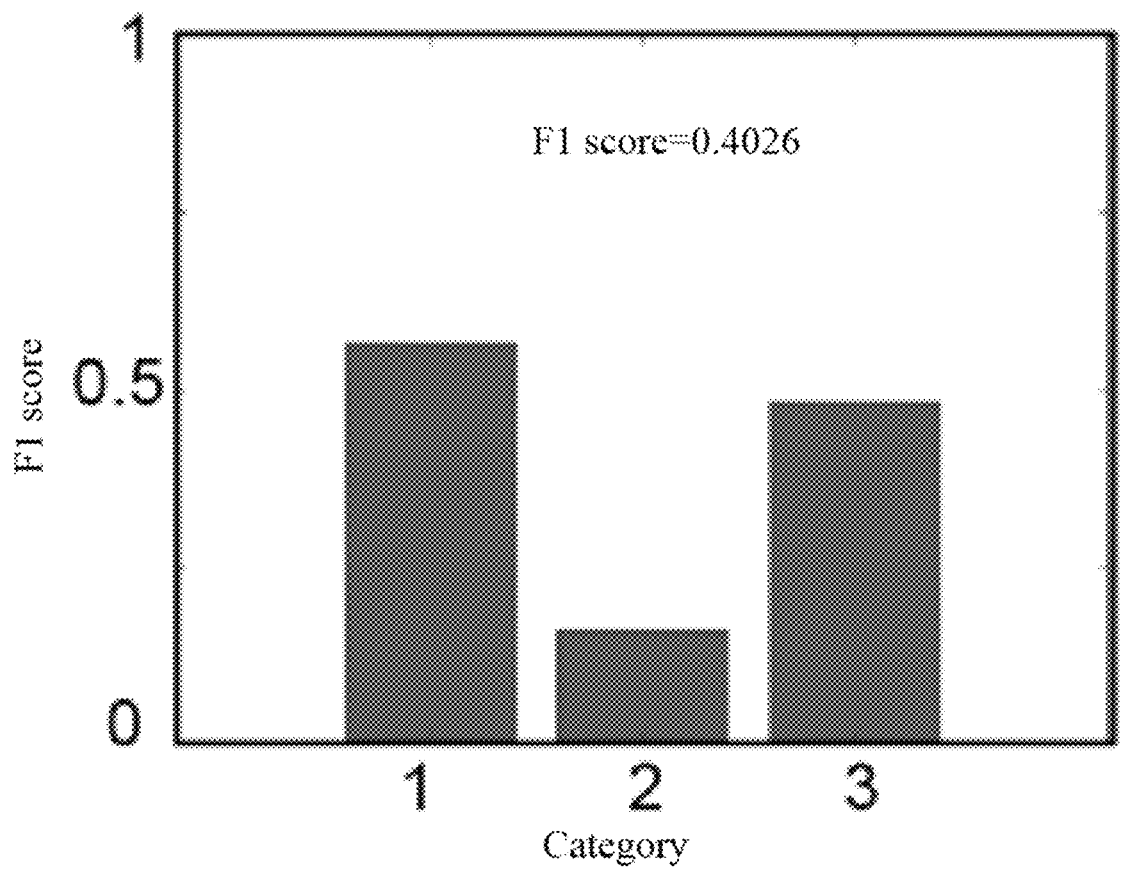
FIG. 5H illustrates a graph showing an evaluation result of an F1 core of the test set of the experiment 2.
Figure 5I:
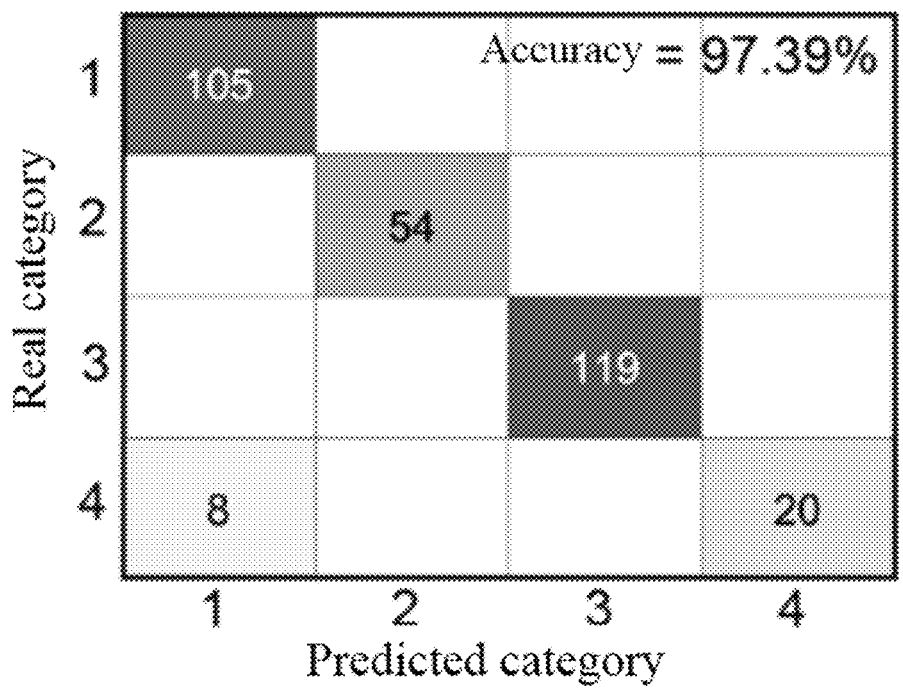
FIG. 5I illustrates a graph showing an evaluation result of a confusion matrix of a training set of an experiment 3.
Figure 5J:
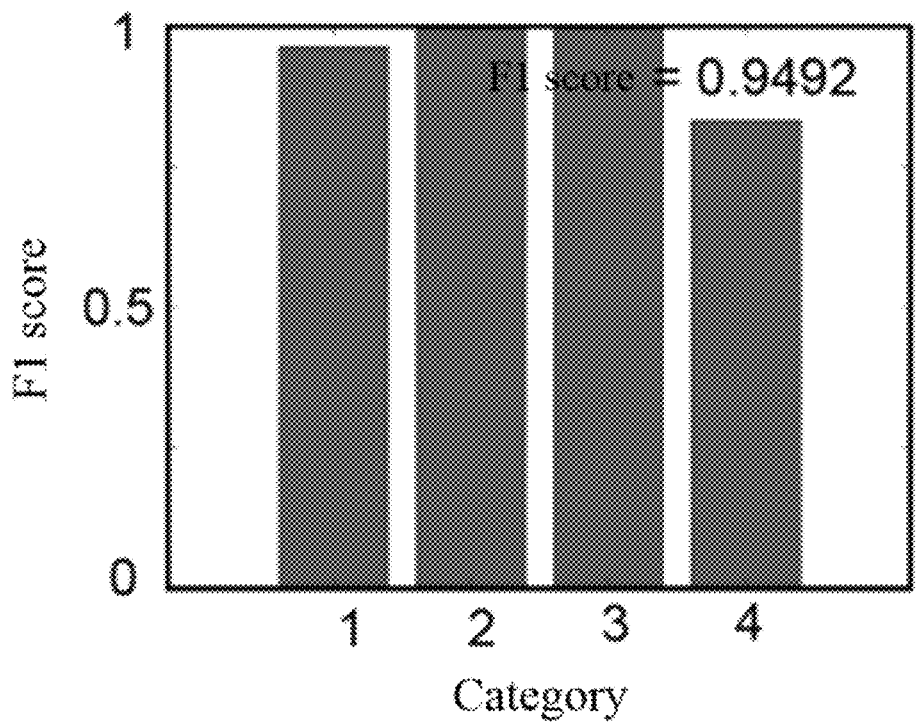
FIG. 5J illustrates a graph showing an evaluation result of an F1 core of the training set of the experiment 3.
Figure 5K:
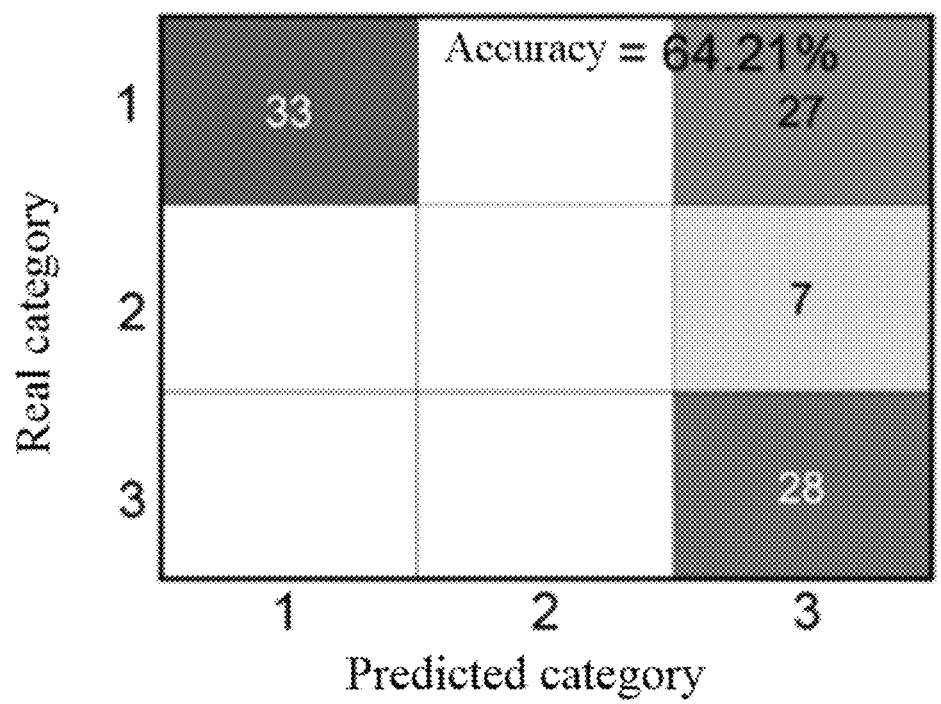
FIG. 5K illustrates a graph showing an evaluation result of a confusion matrix of a test set of the experiment 3.
Figure 5L:
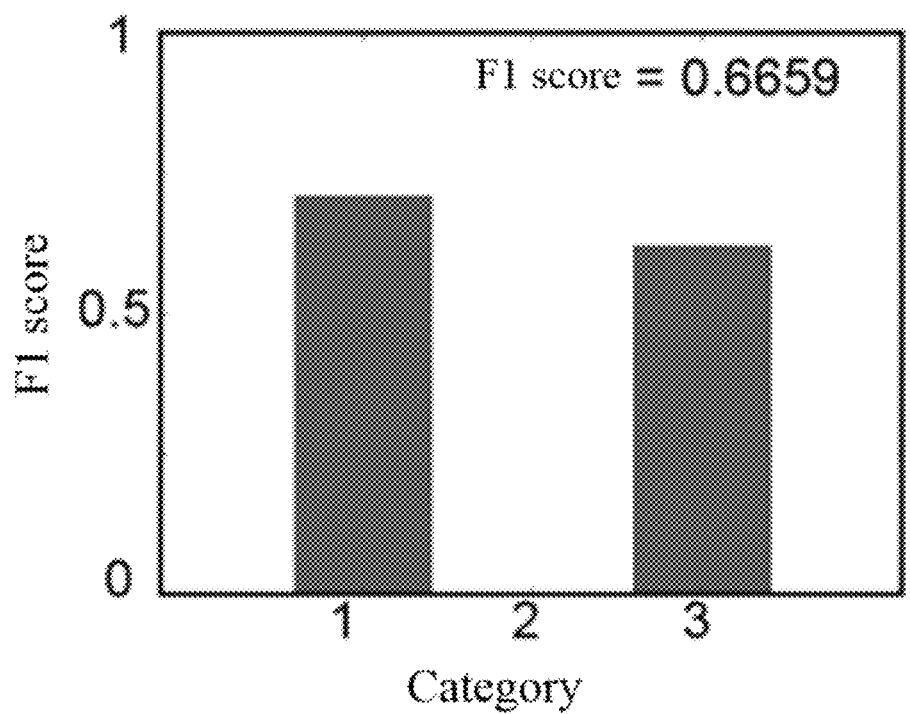
FIG. 5L illustrates a graph showing an evaluation result of an F1 core of the test set of the experiment 3.
Figure 5M:
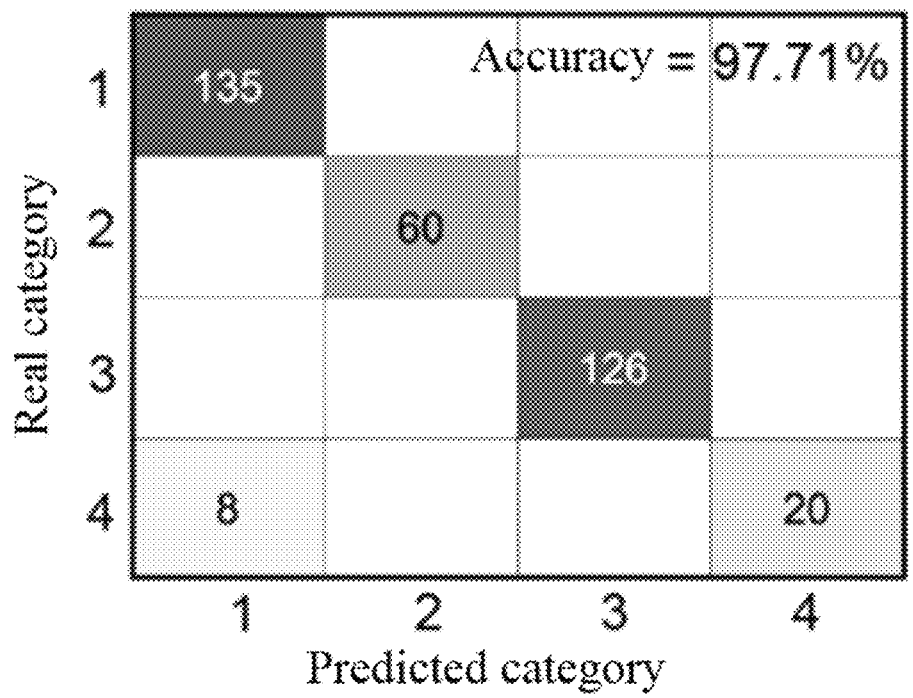
FIG. 5M illustrates a graph showing an evaluation result of a confusion matrix of a training set of an experiment 4.
Figure 5N:
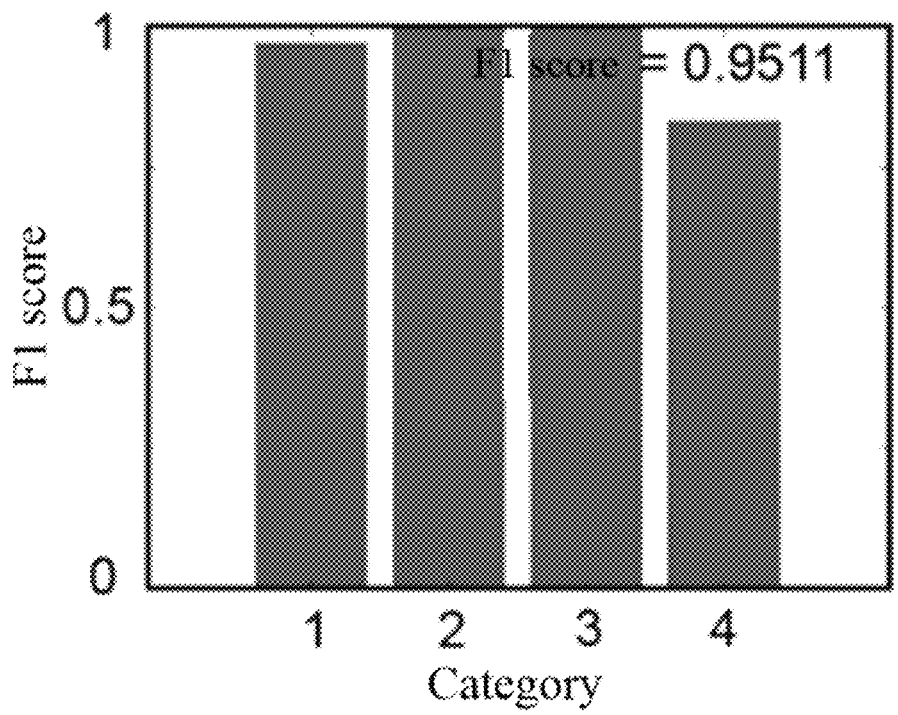
FIG. 5N illustrates a graph showing an evaluation result of an F1 core of the training set of the experiment 4.
Figure 5O:
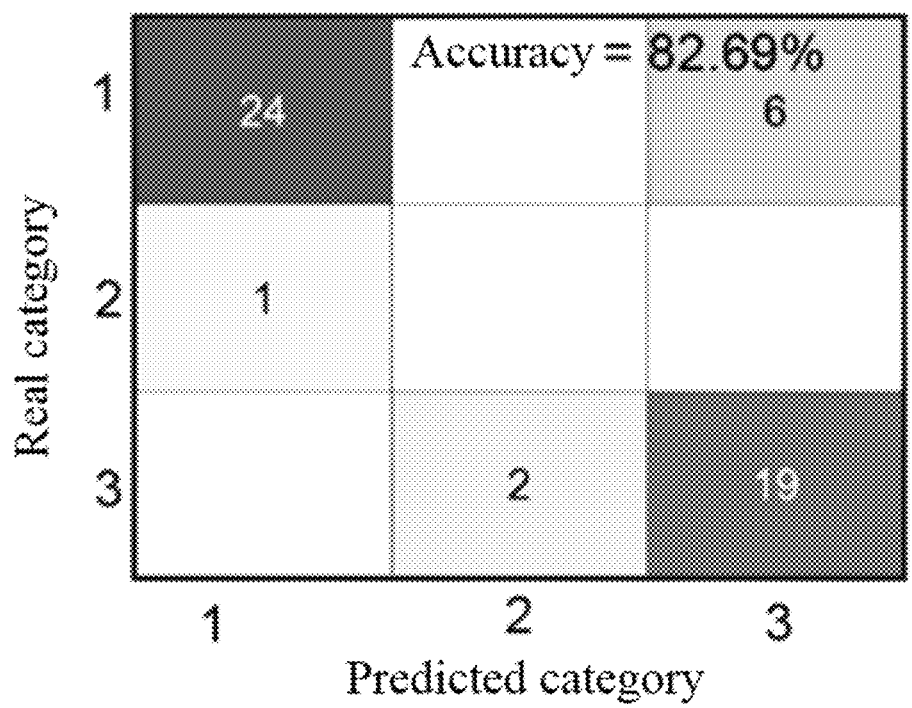
FIG. 5O illustrates a graph showing an evaluation result of a confusion matrix of a test set of the experiment 4.
Figure 5P:
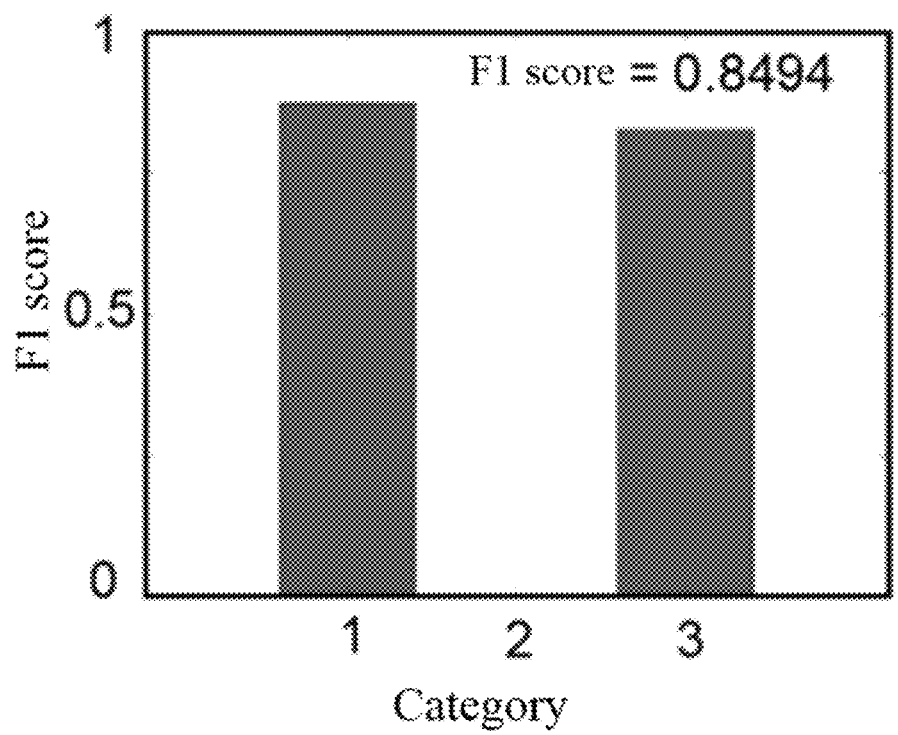
FIG. 5P illustrates a graph showing an evaluation result of an F1 core of the test set of the experiment 4.

Results of the four experiments are shown in FIG. 5A through FIG. 5P. These experiments are based on the field data, using labels from non-training drill holes as the test dataset. Each subplot in each row represents a result of a single experiment, showing the confusion matrices and F1 scores of the training and test sets. Categories 1 to 4 on an x-axis represent slate, dolomite, mineralized dolomite, and sandstone, respectively. The experiments show that increasing the labeled data significantly improves model performance. In the training set, the accuracy is increased from 95.06% to 97.71%, and the F1 score is increased from 0.9391 to 0.9511. The confusion matrix shows that due to data imbalance, eight sandstone samples are misclassified as the slate because a number of slate samples is several times higher. Data augmentation may help address this issue in future research. In the test set, increasing the number of labeled data increases the accuracy from 48.54% to 82.69%, and the F1 score increases from 0.4310 to 0.8494, which indicates that increasing a number of drill holes can improve prediction accuracy in the complex geological environments.

Figure 6:
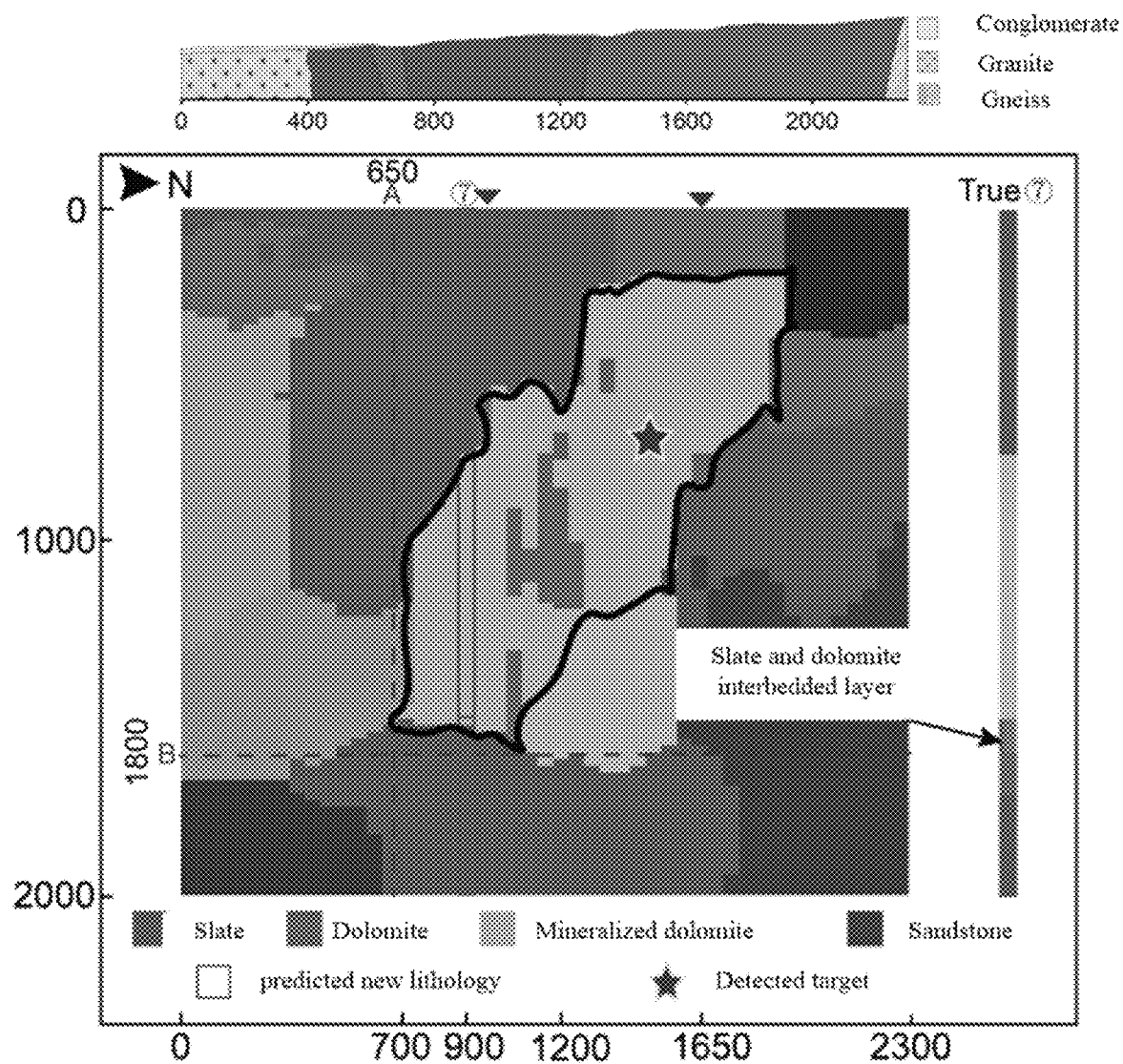
FIG. 6 illustrates a cross-sectional view showing a predicted lithology according to an embodiment of the present disclosure.

Therefore, this embodiment takes a lithologic distribution predicted by the model in the experiment 4 as a final result for discussion. The prediction results are shown in FIG. 6, where "seventh drill hole" indicates a newly studied drill hole (KY14-02-01).

Based on the latest field observations and drilling data, this embodiment systematically verifies and analyzes the reliability of the DCSM model's prediction results. The studied section sequentially exposes conglomerate (with granite outcrops), slate, dolomite, and gneissic tonalite from south to north on the geological map. The DCSM model's prediction results accurately reflect this lithological spatial distribution characteristic, identifying differentiated new lithologies at both ends of a section, and predicting slate and dolomite in the middle, which highly matches the geological mapping data. Especially at a scientific deep well KY14-02-01, located 140 meters southwest of the section's south end (with a drilling depth of about 2000 meters), it provides key verification: the drill hole reveals that from 0 to 0.7 kilometers (km) is mainly slate, an area from 0.7 to 1.5 km has mineralized dolomite, an area from 1.5 to 1.8 km has interbedded slate and dolomite (i.e., slate and dolomite interbedded layer), and an area below 1.8 km mainly has slate, which is highly consistent with the model's prediction results.

The DCSM model shows that the mineralized dolomite below the main and east mining areas turns into slate at a depth of about 1.8 km, which is consistent with the deep drilling data. Combining the regional tectonic evolution background, it is inferred that there may have been a carbonatite magma channel between the main and east mines during the mineralization period of about 1.3 billion years ago in the Bayan Obo mineral deposit, but it was destroyed during the later multiple tectonic modifications. This understanding provides a new perspective for understanding the mineralization process in this area.

Figure 7:
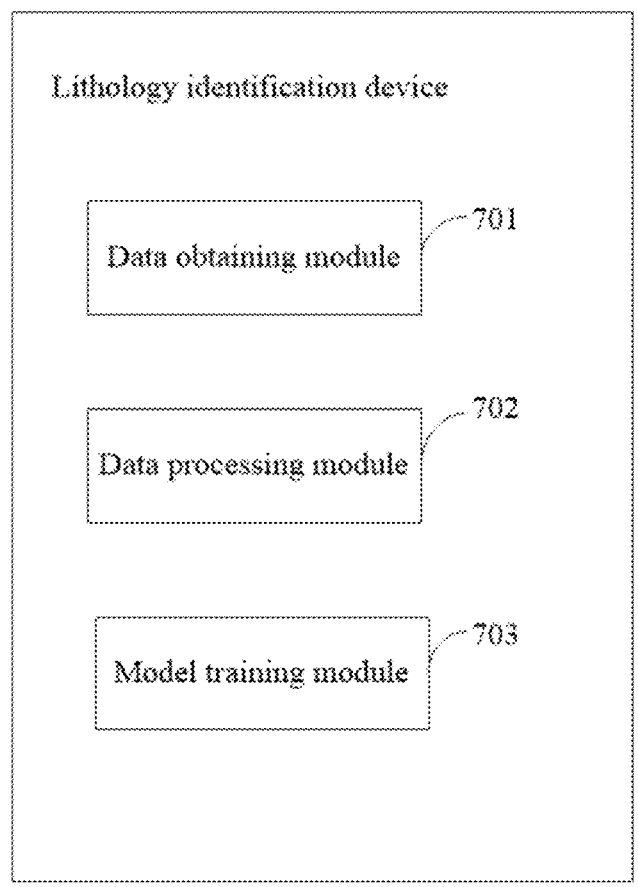
FIG. 7 illustrates a schematic structural diagram of a lithology identification device according to an embodiment of the present disclosure.

FIG. 7 illustrates a schematic structural diagram of a lithology identification device according to an embodiment of the present disclosure. The lithology identification device includes: a data obtaining module 701, a data processing module 702, and a model training module 703.

The data obtaining module 701 is configured to obtain a dataset, where the dataset comprises feature sets and lithology labels, and each feature of the feature sets corresponds spatially one-to-one with a corresponding one of the lithology labels.

The data processing module 702 is configured to perform locality preserving projections (LPP) on the dataset, to thereby obtain a preprocessed dataset.

The model training module 703 is configured to construct a machine learning model, and train the machine learning model by using the preprocessed dataset to obtain a recognition model for lithology identification, where during a process for training the machine learning model, a distance constraint and a geological constraint are introduced sequentially; the distance constraint includes assigning cluster labels by minimizing a distance between each of data points and a nearest cluster center of each of the data points, and selecting an initial cluster center to optimize an assignment process; and the geological constraint uses the lithology labels provided by the preprocessed dataset as a constraint condition.

In some embodiments, the data obtaining module 701 is further configured to:

construct a weight matrix, where the weight matrix is defined by a Gaussian kernel function, and the weight matrix is configured to capture local adjacency relationships between the data points in the dataset;

establish an objective function by taking finding a projection matrix as an optimization target, where the projection matrix is configured to: in a low-dimensional space determined based on the projection matrix, make data still keep an original local structure; and determine the projection matrix based on the objective function, and perform the LPP on the dataset by using the projection matrix to obtain the preprocessed dataset.

In some embodiments, the objective function is expressed as follows:

$$\min_A \Sigma_{i,j} \|A^T x_i - A^T x_j\|^2 W_{ij} A^T X D X^T A = I$$

where X represents a data matrix, D represents a diagonal matrix, I represents an identity matrix, A represents a projection matrix, $x_i$ and $x_j$ respectively represent the an i-th data point and a j-th data point in the dataset, $W_{ij}$ represents a weight matrix of the data points $x_i$ and $x_j$, and T represents an operation of matrix transpose.

In some embodiments, the distance constraint includes:

randomly selecting a sample point from the preprocessed dataset as a first initial cluster center $c_i$;

calculating a shortest distance between each sample point of the preprocessed dataset and existing cluster centers;

calculating a probability of each sample point of the preprocessed dataset being selected as a next cluster center, where a calculation formula for the probability of each sample point of the preprocessed dataset being selected as the next cluster center is expressed as follows:

$$P(x) = \frac{D(x)^2}{\sum_{x \in X1} D(x)^2}$$

where P(x) represents the probability of each sample point of the preprocessed dataset being selected as the next cluster center, x represents the sample point, X1 represents the preprocessed dataset, and D(x) represents the shortest distance between each sample point of the preprocessed dataset and existing cluster centers;

selecting the sample point corresponding to a maximum probability value or a maximum probability distribution as the next cluster center; and iteratively updating the existing cluster centers and cluster assignments of sample points by using a k-means algorithm until the cluster assignments no longer change, comparing posterior probabilities of labeled data points on clusters to determine a category with a highest probability of each of the labeled data points as a most likely category to which each of the labeled data points belongs.

In some embodiments, the geological constraint includes:

identifying, based on the distance constraint, all labeled data points whose labels are different from labels of current labeled data points; and applying a penalty function to a probability of each of the labeled data points on a current cluster based on a formula expressed as follows:

$$r_{nk} = \begin{cases} \alpha \cdot r_{nk}, & \text{if } n \in r_{label\_ind} \\ r_{nk}, & \text{otherwise} \end{cases}$$

where $r_{nk}$ represents a responsibility of a data point n belonging to a distribution k, $r_{label\_ind}$ represents a set of data point indices, each of labels in the set of data point indices $r_{label\_ind}$ is different from a label of a data point with a highest probability belonging to the distribution k, a represents a penalty factor, and otherwise represents $n \notin r_{label\_ind}$.

In some embodiments, the model training module 703 is further configured to: evaluate lithology classification and prediction performance of the recognition model for lithology identification by using an accuracy, a confusion matrix, and an F1 score as evaluation metrics, where calculation formulas for the accuracy and the F1 score are expressed as follows $$\text{Accuracy} = \frac{N_c}{N_T}$$

$$\text{Precision} = \frac{TP}{TP + FP}$$

$$\text{Recall} = \frac{TP}{TP + FN}$$

$$F1 = 2 \times \frac{\text{Precision} \times \text{Recall}}{\text{Precision} + \text{Recall}}$$

where Accuracy represents the accuracy, $N_c$ represents a number of samples correctly classified or predicted, $N_T$ represents a total number of samples, Precision represents a precision, Recall represents a recall, F1 represents the F1 score, TP represents a number of instances correctly predicted as positive, FP represents a number of instances incorrectly predicted as positive, and FN represents a number of instances incorrectly predicted as negative.

The lithology identification device provided by this embodiment can be used to execute the above-mentioned lithology identification method, and its implementation principle and technical effect are similar, so the details of this embodiment are not repeated herein.

It should be noted that, each of the data obtaining module 701, the data processing module 702, and the model training module 703 is embodied by software stored in at least one memory and executable by at least one processor.

An embodiment of the present disclosure provides an electronic apparatus, which may include a processor and a memory, where the processor and the memory can communicate with each other. Exemplarily, the processor communicates with the memory through a communication bus, the memory is configured to store computer-executed instructions, and the processor is configured to call the computer-executed instructions in the memory to execute the lithology identification method shown in any of the above method embodiments.

The processor may be a central processing unit (CPU), another general processor, a digital signal processor (DSP), or an application specific integrated circuit (ASIC). The general processor may be a microprocessor or the processor can be any conventional processor, etc. The steps of the method disclosed in this present disclosure can be directly embodied as the completion of execution by a hardware processor, or the completion of execution by a combination of hardware and software modules in the processor.

The present disclosure provides a non-transitory computer-readable storage medium, on which computer-executable instructions are stored. The computer-executed instructions, when executed by a processor, are configured to implement the lithology identification method as in any of the above embodiments.

Other embodiments of the present disclosure will easily occur to those skilled in the art after considering the specification and practicing the invention disclosed herein. The present disclosure is intended to cover any variations, uses or adaptations of the present disclosure, which follow the general principles of the present disclosure and include common sense or common technical means in this technical field that are not disclosed in the present disclosure. The specification and examples are to be regarded as exemplary only, with the true scope and spirit of the application being indicated by the following claims.

It should be understood that the present disclosure is not limited to the precise structure that has been described above and shown in the drawings, and various modifications and changes can be made without departing from its scope. The scope of the present disclosure is limited only by the appended claims.

What is claimed is:

1. A lithology identification method, comprising:
obtaining a dataset, wherein the dataset comprises feature sets and lithology labels, and each feature of the feature sets corresponds spatially one-to-one with a corresponding one of the lithology labels;
performing locality preserving projections (LPP) on the dataset, to thereby obtain a preprocessed dataset, comprising:
constructing a weight matrix, wherein the weight matrix is defined by a Gaussian kernel function, and the weight matrix is configured to capture local adjacency relationships between data points in the dataset;
establishing an objective function by taking finding a projection matrix as an optimization target, wherein the projection matrix is configured to: in a low-dimensional space determined based on the projection matrix, make data still keep an original local structure; and
determining the projection matrix based on the objective function, and performing the LPP on the dataset by using the projection matrix to obtain the preprocessed dataset; and
constructing a machine learning model, and training the machine learning model by using the preprocessed dataset to obtain a recognition model for lithology identification, wherein during a process for training the machine learning model, a distance constraint and a geological constraint are introduced sequentially; the distance constraint comprises assigning cluster labels by minimizing a distance between each of the data points and a nearest cluster center of each of the data points, and selecting an initial cluster center to optimize an assignment process; and the geological constraint uses the lithology labels provided by the preprocessed dataset as a constraint condition.

2. The lithology identification method as claimed in claim 1, wherein the objective function is expressed as follows:

$$\min_A \Sigma_{i,j} \|A^T x_i - A^T x_j\|^2 W_{ij} A^T X D X^T A = I$$

where X represents a data matrix, D represents a diagonal matrix, I represents an identity matrix, A represents a projection matrix, $x_i$ and $x_j$ respectively represent the an i-th data point and a j-th data point in the dataset, $W_{ij}$ represents a weight matrix of the data points $x_i$ and $x_j$, and T represents an operation of matrix transpose.

3. The lithology identification method as claimed in claim 1, wherein the distance constraint comprises:
randomly selecting a sample point from the preprocessed dataset as a first initial cluster center $c_i$;
calculating a shortest distance between each sample point of the preprocessed dataset and existing cluster centers;
calculating a probability of each sample point of the preprocessed dataset being selected as a next cluster center, wherein a calculation formula for the probability of each sample point of the preprocessed dataset being selected as the next cluster center is expressed as follows:

$$P(x) = \frac{D(x)^2}{\sum_{x \in X1} D(x)^2}$$

where $P(x)$ represents the probability of each sample point of the preprocessed dataset being selected as the next cluster center, x represents the sample point, X1 represents the preprocessed dataset, and $D(x)$ represents the shortest distance between each sample point of the preprocessed dataset and the existing cluster centers;
selecting the sample point corresponding to a maximum probability value or a maximum probability distribution as the next cluster center; and
iteratively updating the existing cluster centers and cluster assignments of sample points by using a k-means algorithm until the cluster assignments no longer change, and comparing posterior probabilities of labeled data points on clusters to determine a category with a highest probability of each of the labeled data points as a most likely category to which each of the labeled data points belongs.

4. The lithology identification method as claimed in claim 1, wherein the geological constraint comprises:
identifying, based on the distance constraint, all labeled data points whose labels are different from labels of current labeled data points; and
applying a penalty function to a probability of each of the labeled data points on a current cluster based on a formula expressed as follows:

$$r_{nk} = \begin{cases} \alpha \cdot r_{nk}, & \text{if } n \in r_{label\_ind} \\ r_{nk}, & \text{otherwise} \end{cases}$$

where $r_{nk}$ represents a responsibility of a data point n belonging to a distribution k, $r_{label\_ind}$ represents a set of data point indices, each of labels in the set of data point indices $r_{label\_ind}$ is different from a label of a data point with a highest probability belonging to the distribution k, $\alpha$ represents a penalty factor, and otherwise represents $n \notin r_{label\_ind}$.

5. The lithology identification method as claimed in claim 1, further comprising:
evaluating lithology classification and prediction performance of the recognition model for lithology identification by using an accuracy, a confusion matrix, and an F1 score as evaluation metrics, wherein calculation formulas for the accuracy and the F1 score are expressed as follows $$Accuracy = \frac{N_c}{N_T}$$

$$Precision = \frac{TP}{TP+FP}$$

$$Recall = \frac{TP}{TP+FN}$$

$$F1 = 2 \times \frac{Precision \times Recall}{Precision + Recall}$$

where Accuracy represents the accuracy, $N_c$ represents a number of samples correctly classified or predicted, $N_T$ represents a total number of samples, Precision represents a precision, Recall represents a recall, F1 represents the F1 score, TP represents a number of instances correctly predicted as positive, FP represents a number of instances incorrectly predicted as positive, and FN represents a number of instances incorrectly predicted as negative.

6. An electronic apparatus, comprising: a processor and a memory, wherein the memory is configured to store instructions, and the processor is configured to execute the instructions stored in the memory to cause the electronic apparatus to perform the lithology identification method as claimed in claim 1.

7. A non-transitory computer-readable storage medium, wherein computer-executable instructions are stored in the non-transitory computer-readable storage medium, and the computer-executable instructions, when executed by a processor, are configured to implement the lithology identification method as claimed in claim 1.

8. A lithology identification device, comprising:
a data obtaining module, configured to obtain a dataset, wherein the dataset comprises feature sets and lithology labels, and each feature of the feature sets corresponds spatially one-to-one with a corresponding one of the lithology labels;
a data processing module, configured to:
construct a weight matrix, wherein the weight matrix is defined by a Gaussian kernel function, and the weight matrix is configured to capture local adjacency relationships between data points in the dataset;
establish an objective function by taking finding a projection matrix as an optimization target, wherein the projection matrix is configured to: in a low-dimensional space determined based on the projection matrix, make data still keep an original local structure; and
determine the projection matrix based on the objective function, and perform LPP on the dataset by using the projection matrix to obtain the preprocessed dataset; and
a model training module, configured to construct a machine learning model, and train the machine learning model by using the preprocessed dataset to obtain a recognition model for lithology identification, wherein during a process for training the machine learning model, a distance constraint and a geological constraint are introduced sequentially; the distance constraint comprises assigning cluster labels by minimizing a distance between each of the data points and a nearest cluster center of each of the data points, and selecting an initial cluster center to optimize an assignment process; and the geological constraint uses the lithology labels provided by the preprocessed dataset as a constraint condition.

* * * * *